United States Patent
Guvvakallu Sivamoorthy et al.

(10) Patent No.: US 11,960,914 B2
(45) Date of Patent: Apr. 16, 2024

(54) METHODS AND SYSTEMS FOR SUGGESTING AN ENHANCED MULTIMODAL INTERACTION

(71) Applicant: SAMSUNG ELECTRONICS CO., LTD., Suwon-si (KR)

(72) Inventors: Praveen Kumar Guvvakallu Sivamoorthy, Bengaluru (IN); Mayank Kumar Tyagi, Bengaluru (IN); Navin N, Bengaluru (IN); Aravindh N, Bengaluru (IN); Sanofer H, Bengaluru (IN); Sudip Roy, Bengaluru (IN); Arjun Janardhanan Kappatan, Bengaluru (IN); Lalith Satya Vara Prasad Medeti, Bengaluru (IN); Vrajesh Navinchandra Sejpal, Bengaluru (IN); Saumitri Choudhury, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/127,512

(22) Filed: Mar. 28, 2023

(65) Prior Publication Data
US 2023/0236858 A1 Jul. 27, 2023

Related U.S. Application Data

(63) Continuation of application No. PCT/KR2022/018342, filed on Nov. 18, 2022.

(30) Foreign Application Priority Data

Nov. 19, 2021 (IN) .............................. 202141053387

(51) Int. Cl.
 G06F 17/00 (2019.01)
 G06F 3/01 (2006.01)
 G06F 9/451 (2018.01)

(52) U.S. Cl.
 CPC .............. *G06F 9/453* (2018.02); *G06F 3/011* (2013.01)

(58) Field of Classification Search
 CPC .......... G06F 9/453; G06F 3/011; G06F 3/167; G06F 2203/011; G06F 2203/0381; G06Q 30/0251; H04M 1/72454
 See application file for complete search history.

(56) References Cited

U.S. PATENT DOCUMENTS 8,195,468 B2 6/2012 Weider et al.
8,942,849 B2 1/2015 Maisonnier et al.
(Continued)

FOREIGN PATENT DOCUMENTS

KR 10-1880775 B1 8/2018
WO WO-2014124741 A1 * 8/2014 ........... G06F 3/0481
WO WO-2021027267 A1 * 2/2021 ............. G06F 3/167

OTHER PUBLICATIONS

International Search Report dated Feb. 15, 2023 issued by the International Searching Authority in counterpart International Application No. PCT/KR2022/018342 (PCT/ISA/210).
(Continued)

*Primary Examiner* — Laurie A Ries
(74) *Attorney, Agent, or Firm* — Sughrue Mion, PLLC

(57) ABSTRACT

Provided are methods and systems for suggesting an enhanced multimodal interaction. The method for suggesting at least one modality of interaction, includes: identifying, by an electronic device, initiation of an interaction by a user with a first device using a first modality; detecting, by the electronic device, an intent of the user and a state of the user based on the identified initiated interaction; determin- (Continued)

ing, by the electronic device, at least one of a second modality and at least one second device, to continue the initiated interaction, based on the detected intent of the user and the detected state of the user; and providing, by the electronic device, a suggestion to the user to continue the interaction with the first device using the determined second modality, by indicating the second modality on the first device or the at least one second device.

20 Claims, 23 Drawing Sheets

(56) References Cited

U.S. PATENT DOCUMENTS

| | | | |
|---|---|---|---|
| 9,477,943 B2* | 10/2016 | Levien | G06Q 10/10 |
| 9,570,070 B2* | 2/2017 | Baldwin | G10L 15/18 |
| 9,762,733 B1 | 9/2017 | Ramanujaiaha et al. | |
| 9,906,927 B2* | 2/2018 | Levien | H04W 4/18 |
| 10,115,370 B2 | 10/2018 | Min | |
| 10,223,411 B2* | 3/2019 | Mauro | G06F 16/3329 |
| 11,704,745 B2* | 7/2023 | Poddar | G06F 40/242 |
| | | | 382/103 |
| 2012/0032894 A1 | 2/2012 | Parivar et al. | |
| 2012/0109868 A1* | 5/2012 | Murillo | G06F 21/84 |
| | | | 706/46 |
| 2012/0166365 A1* | 6/2012 | Tur | G06F 9/453 |
| | | | 706/11 |
| 2013/0218339 A1 | 8/2013 | Maisonnier et al. | |
| 2013/0304473 A1* | 11/2013 | Baldwin | G10L 15/24 |
| | | | 704/257 |
| 2014/0181715 A1* | 6/2014 | Axelrod | H04M 1/72454 |
| | | | 715/771 |
| 2014/0212854 A1* | 7/2014 | Divakaran | G09B 19/00 |
| | | | 434/236 |
| 2015/0040040 A1* | 2/2015 | Balan | G06F 3/011 |
| | | | 715/762 |
| 2015/0309561 A1* | 10/2015 | Stewart | G06F 3/01 |
| | | | 345/156 |
| 2015/0363047 A1 | 12/2015 | Mathur | |
| 2016/0313868 A1 | 10/2016 | Weng et al. | |
| 2017/0323220 A1 | 11/2017 | Gordon et al. | |
| 2019/0391827 A1* | 12/2019 | Simanovich | G06Q 30/0281 |
| 2020/0104900 A1* | 4/2020 | Mohiuddin Khan | G06F 3/013 |
| 2020/0210781 A1* | 7/2020 | Desilets-Benoit | G06V 40/20 |
| 2021/0141349 A1 | 5/2021 | Jain | |
| 2022/0415472 A1* | 12/2022 | Hakala | G06N 20/20 |

OTHER PUBLICATIONS

International Written Opinion dated Feb. 15, 2023 issued by the International Searching Authority in counterpart International Application No. PCT/KR2022/018342 (PCT/ISA/237).

Communication dated Sep. 15, 2023 by the India Patent Office in Indian Patent Application No. 202141053387.

* cited by examiner

METHODS AND SYSTEMS FOR SUGGESTING AN ENHANCED MULTIMODAL INTERACTION

CROSS-REFERENCE TO RELATED APPLICATION(S)

This application is a bypass continuation of PCT International Application No. PCT/KR2022/018342, which was filed on Nov. 18, 2022, and claims priority to Indian Patent Application No. 202141053387, filed on Nov. 19, 2021, in the Indian Patent Office, the disclosures of which are incorporated herein by reference in their entireties.

BACKGROUND

1. Field

The disclosure relates to Multi Device Experience (MDE) scenarios, and more particularly to suggesting a modality to a user for naturally interacting with at least one user device in an MDE scenario.

2. Description of the Related Art

In rapidly evolving personalized smart device Multi Device Experience (MDE) scenarios, users may interact with multiple user devices using multiple modalities/input interfaces (e.g., touch, voice, hand gestures, head gestures, or the like). However, in related approaches, most of the users may not be aware of right/appropriate modalities that the users may use to interact with the user devices, as depicted in FIG. 1A. Thus, the user may not be aware of MDE that the user can obtain from the user devices. For example, the user may always interact with the user device using a specific modality (e.g., touch) irrespective of different conditions, surrounding environment, or the like. Such interactions may not be natural and most efficient to the user, for the given situation.

FIGS. 1B to 1F depict exemplary interactions of the user with the user devices without being aware of the appropriate/best modalities for the interactions.

FIG. 1B depicts an example scenario, which emphasizes on the usage of the appropriate devices. As depicted in FIG. 1B, the user is mowing grass using scissors without being aware of the best tool or device available for mowing the grass.

FIG. 1C depicts an example scenario highlighting a need of an alternate modality which is best suited in the given situation. As depicted in FIG. 1C, the user is not in a position to access his mobile phone to touch and perform some operation. However, in such situation, using a voice interaction is a better and easy way compared to performing the touch interaction.

Consider another example scenario, as depicted in FIG. 1D, wherein the user tries to find a song to play using a mobile device, while driving a car. However, such an interaction may result in accidents.

Consider another example scenario, as depicted in FIG. TE, wherein the user struggles to dial a number using a mobile phone in a medical emergency situation. Such an interaction may be fatal for the user.

Consider another example scenario, as depicted in FIG. 1F, wherein the user in a dark room sets an alarm in a mobile phone manually by performing a touch interaction. However, such an interaction may cause inconvenient experience for the user.

In the above example scenarios, the users may not be aware of using the most appropriate/best modality to interact with the user devices. However, the related approaches do not involve any mechanisms to suggest the users to switch to the appropriate modalities for the interactions with the user devices.

SUMMARY

Provided are methods and systems for suggesting at least one modality for interactions with a plurality of user devices.

Further provided are methods and systems for detecting an intent and a state of the user, when the user initiates an interaction with a first device using a first modality.

Further provided are methods and systems for determining a second modality and at least one second device to continue the initiated interaction based on the detected intent and state of the user.

Further provided are methods and systems for providing a suggestion to the user to continue the interaction with the first device using the determined second modality, by indicating the second modality on the first device or the at least one second device, wherein the first device and the at least one second device belong to the plurality of user devices associated with the user.

According to an aspect of the disclosure, a method for suggesting at least one modality of interaction, includes: identifying, by an electronic device, initiation of an interaction by a user with a first device using a first modality; detecting, by the electronic device, an intent of the user and a state of the user based on the identified initiated interaction; determining, by the electronic device, at least one of a second modality and at least one second device, to continue the initiated interaction, based on the detected intent of the user and the detected state of the user; and providing, by the electronic device, a suggestion to the user to continue the interaction with the first device using the determined second modality, by indicating the second modality on the first device or the at least one second device.

The detecting, by the electronic device, the intent of the user may include analyzing at least one of the first modality, the interaction of the user with the first device, an interaction history, and data collected from a plurality of user devices associated with the user to detect the intent of the user.

The data collected from the plurality of user devices may include at least one of user parameters, and a status and location of each user device.

The detecting, by the electronic device, the state of the user may include: determining a context of the user based on user parameters collected from a plurality of user devices associated with the user; and analyzing the first modality and the context of the user to detect the state of the user.

The determining, by the electronic device, the at least one of the second modality and the at least one second device may include: creating an intent-state pair, based on the detected intent of the user and the detected state of the user corresponding to the initiated interaction with the first device; querying an intent-state-modality mapping database for the created intent-state pair, wherein the intent-state-modality mapping database may include a mapping of the second modality and the at least one second device with each of a plurality of intent and state pairs; and receiving information about the second modality and the at least one second device for the created intent-state pair from the intent-state-modality mapping database.

The providing, by the electronic device, the suggestion may include: generating a promotion content corresponding to the second modality; and providing the suggestion to the user to continue the interaction with the first device using the second modality, by indicating the promotion content corresponding to the second modality on the first device or the at least one second device.

The generating the promotion content corresponding to the second modality may include: extracting at least one natural user interface (NUI) template from a NUI template database corresponding to the second modality and device characteristics of the first device or the at least one second device; and generating the promotion content corresponding to the second modality in the extracted NUI template, based on at least one of the intent and the state of the user, and the second modality.

The NUI template database may include a mapping of a plurality of NUI templates with each of a plurality of modalities and each of the device characteristics of the first device or the at least one second device.

The indicating the promotion content corresponding to the second modality on the first device or the at least one second device may include: generating a NUI interface on the first device, or the at least one second device based on at least one user interface (UI) element supported by the first device or the at least one second device; and indicating the promotion content corresponding to the second modality in the at least one NUI template on the NUI interface generated on the first device or the at least one second device.

The providing, by the electronic device, the suggestion may include generating, by the electronic device, a user interface on the first device or the at least one second device for continuing the interaction using the second modality on the first device.

The determining the at least one of the second modality and the at least one second device may include evaluating the state of the user using a multi-device input to determine the at least one of the second modality and the at least one second device.

The generating the user interface on the first device or the at least one second device may include: crafting a Natural User Interface (NUI) information by evaluating at least one of the intent and the state of the user, and the second modality; and assembling the crafted NUI information in the user interface generated on the first device or the second device.

The NUI information indicates to the user about the second modality in a required media type to continue the interaction with the first device.

According to an aspect of the disclosure, an electronic device includes: a memory storing instructions; and a processor configured to execute the instructions to: identify an initiation of interaction by a user with a first device using a first modality; detect an intent of the user and a state of the user based on the identified initiated interaction; determine at least one of a second modality and at least one second device to continue the interaction, based on the detected intent and state of the user; and provide a suggestion to the user to continue the interaction with the first device using the determined second modality, by indicating the second modality on the first device or the at least one second device.

The processor may be further configured to execute the instructions to analyze at least one of the first modality, the interaction of the user with the first device, an interaction history, and data collected from a plurality of user devices associated with the user to detect the intent of the user.

The processor may be further configured to execute the instructions to detect the state of the user by: determining a context of the user based on the user parameters collected from a plurality of user devices associated with the user; and analyzing the first modality and the context of the user to detect the state of the user.

The processor may be further configured to execute the instructions to: create an intent-state pair, based on the detected intent and the state of the user corresponding to the initiated interaction with the first device; query an intent-state-modality mapping database for the created intent-state pair, wherein the intent-state-modality mapping database includes a mapping of the second modality and the at least one second device with each of a plurality of intent and state pairs; and receive information about the second modality and the at least one second device for the created intent-state pair from the intent-state-modality mapping database.

The processor may be further configured to execute the instructions to: generate a promotion content corresponding to the second modality; and provide the suggestion to the user to continue the interaction with the first device using the second modality, by indicating the promotion content corresponding to the second modality on the first device or the at least one second device.

The processor may be further configured to execute the instructions to: extract at least one natural user interface (NUI) template from a NUI template database corresponding to the second modality and device characteristics of the first device or the at least one second device; and generate the promotion content corresponding to the second modality in the extracted NUI template, based on at least one of the intent and the state of the user, and the second modality.

According to an aspect of the disclosure, a non-transitory computer readable medium for storing computer readable program code or instructions which are executable by a processor to perform a method for suggesting at least one modality of interaction, the method including: identifying, by an electronic device, initiation of an interaction by a user with a first device using a first modality; detecting, by the electronic device, an intent of the user and a state of the user based on the identified initiated interaction; determining, by the electronic device, at least one of a second modality and at least one second device, to continue the initiated interaction, based on the detected intent and state of the user; and providing, by the electronic device, a suggestion to the user to continue the interaction with the first device using the determined second modality, by indicating the second modality on the first device or the at least one second device.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
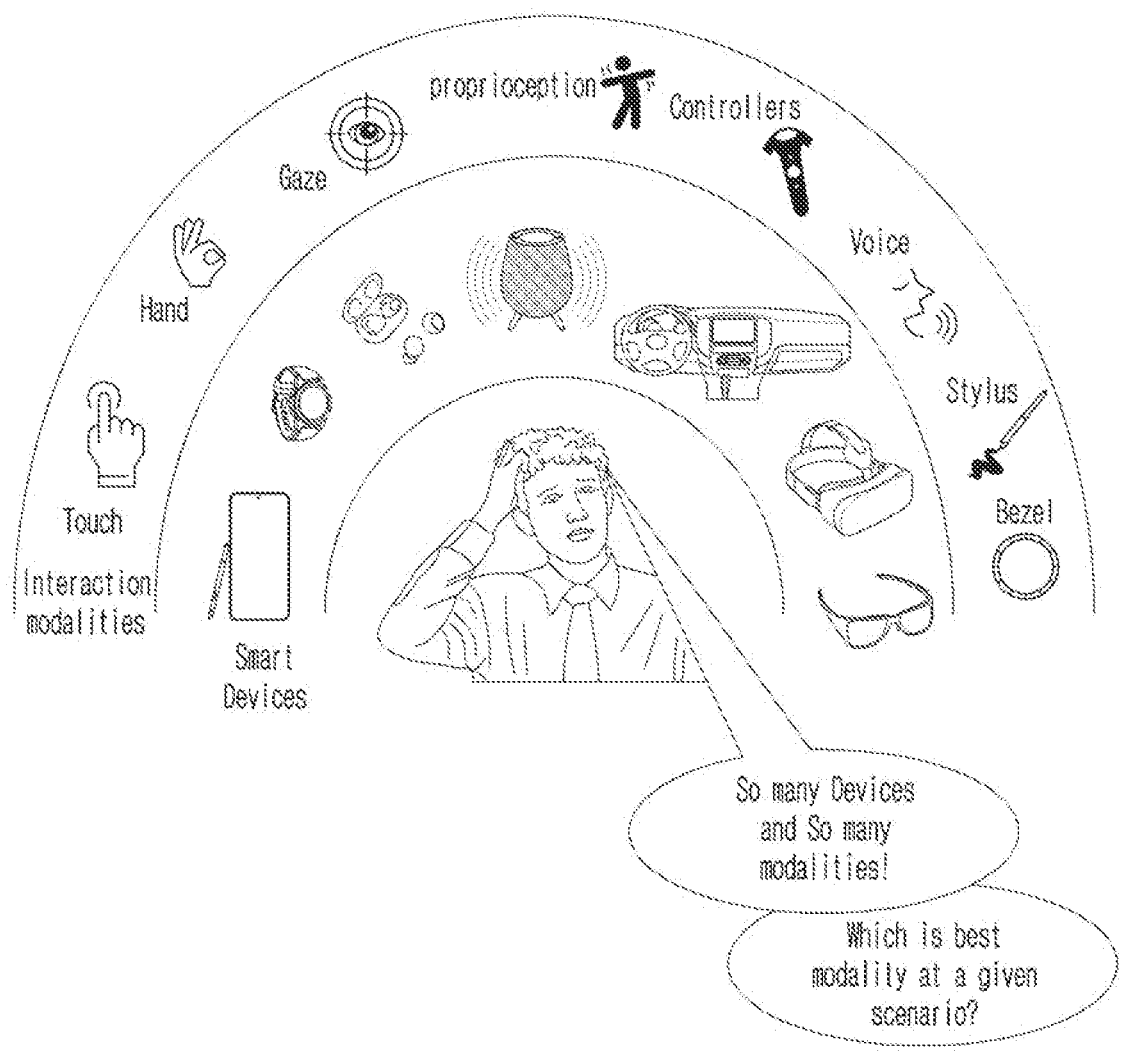
FIGS. 1A-1F depict exemplary interactions of a user with user devices without being aware of appropriate/best modalities for the interactions.
Figure 1B:
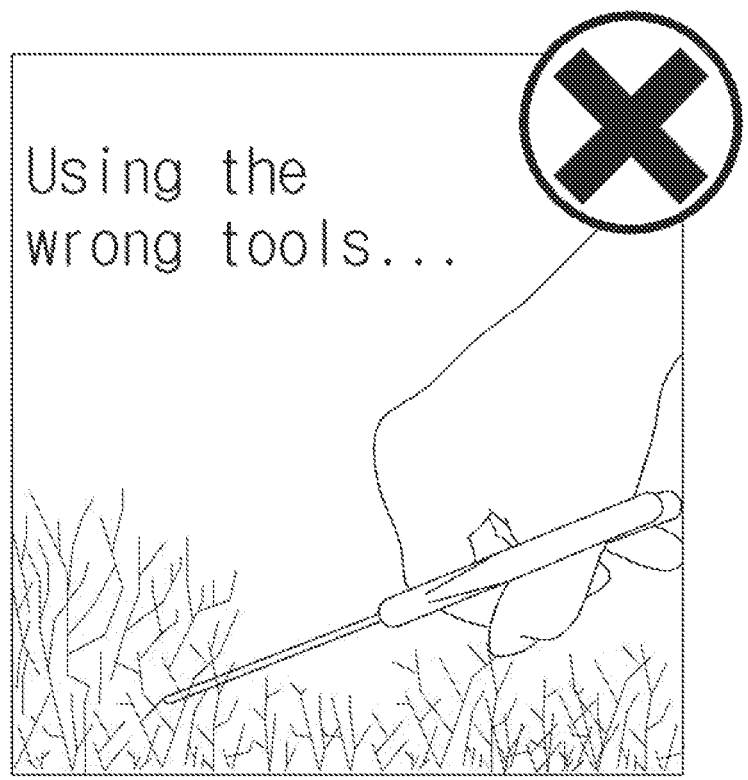
Figure 1C:
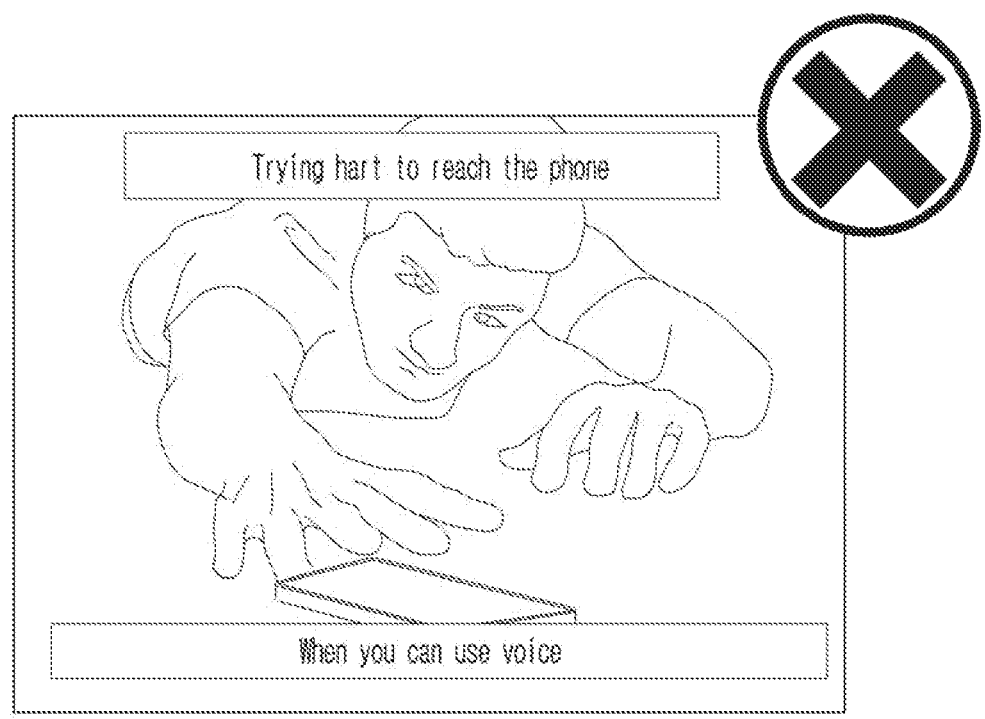
Figure 1D:
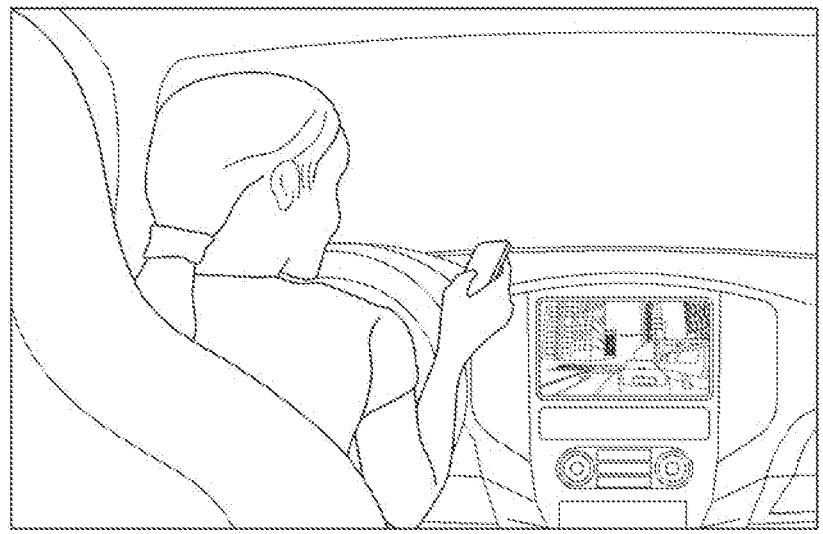
Figure 1E:
Figure 1F:
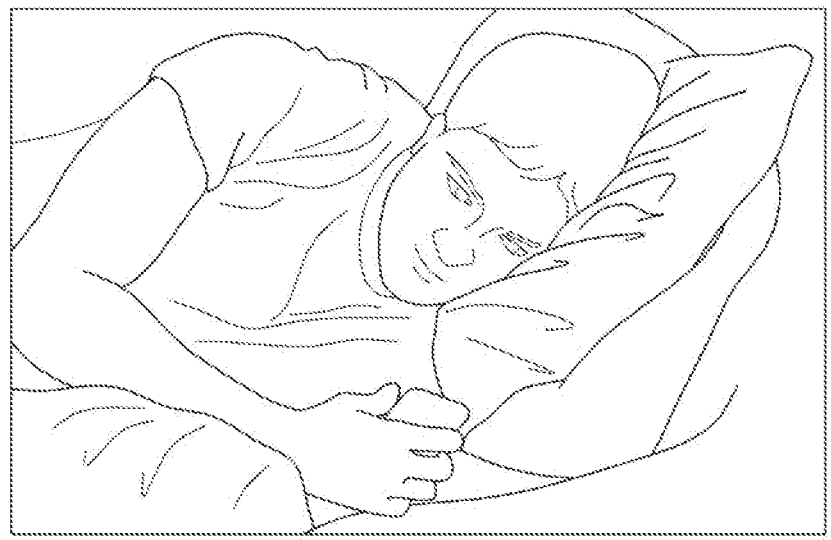

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for enabling a user to interact more naturally with multiple user devices using an appropriate modality.

Embodiments herein disclose methods and systems for detecting an intent and a state of the user in response to an initiation of user interaction with a first device using a first modality.

Embodiments herein disclose methods and systems for determining at least one of an alternative/second device and a second modality for continuing the initiated user interaction based on the intent and the state of the user.

Embodiments herein disclose methods and systems for dynamically generating an interface suitable for continuing the initiated user interaction using at least one of the second device and the second modality.

Reference will now be made in detail to embodiments of the disclosure, which are illustrated in the accompanying drawings, wherein like reference numerals refer to the like elements throughout.

Figure 2:
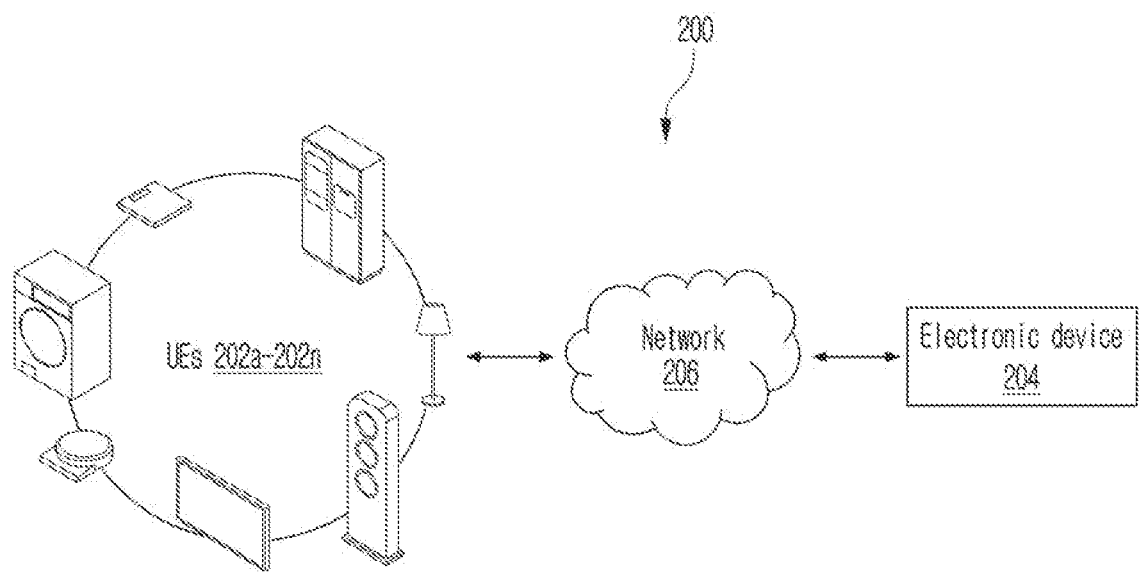
FIG. 2 depicts a Multi-Modal Interaction (MMI) based system/Multi Device Experience (MDE) system, according to various embodiments.

FIG. 2 depicts a Multi-Modal Interaction (MMI) or Multi Device Experience (MDE) system 200, according to various embodiments. The MMI/MDE system 200 includes a plurality of user devices 202a-202n and an electronic device 204 present in an Internet of Things (IoT) environment. Examples of the IoT environment may be, but are not limited to, a smart home environment, a smart office environment, a smart hospital environment, a smart vehicle infotainment system, a smart vehicle parking system, and so on. In an embodiment, the electronic device 204 may be one of the plurality of user devices 202a-202n. Thus, the electronic device 204 may operate as the user device (202a-202n), or the user device (202a-202n) may operate as the electronic device 204 interchangeably.

The plurality of user devices 202a-202n and the electronic device 204 may be connected with each other. In an example, the plurality of user devices 202a-202n and the electronic device 204 may be connected with each other using a communication network 206. The communication network 206 may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on. In another example, the plurality of user devices 202a-202n and the electronic device 204 may be connected with each other directly (e.g., via a direct communication, via an access point, and so on). In another example, the plurality of user devices 202a-202n and the electronic device 204 may be connected with each other via a relay, a hub, and a gateway. It is understood that the plurality of user devices 202a-202n and the electronic device 204 may be connected to each other in any of various manners (including those described above) and may be connected to each other in two or more of various manners (including those described above) at the same time.

The plurality of user devices 202a-202n may be IoT devices, which have been controlled by the electronic device 204 or the user to perform one or more actions. Examples of the plurality of user devices 202a-202n may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a smart plug, a portable multimedia player (PMP), an MP3 player, a speaker, a voice assistant, a mobile medical device, a light, a voice assistant device, a camera, a home appliance, a wearable device (e.g., a smart watch, a smart ornament, or the like), one or more sensors, an Augmented Reality (AR)/Virtual Reality (VR) device, and so on. Examples of the home appliance may be, but are not limited to, a television (TV), a digital video disk (DVD) player, an audio device, a refrigerator, an air conditioner (AC), an air purifier, a chimney, a cooktop, a vacuum cleaner, an oven, microwave, a washing machine, a dryer, a set-top box, a home automation control panel, a security control panel, a game console, an electronic key, a camcorder, an electronic picture frame, a coffee maker, an oven, a rice cooker, a pressure cooker, and so on. Examples of the sensors may be, but are not limited to, an eye tracker, a motion sensor, a temperature sensor, a humidity sensor, an infrared sensor, a gyroscope sensor, an atmospheric sensor, a proximity sensor, an RGB sensor (a luminance sensor), a photosensor, a thermostat, an Ultraviolet (UV) light sensor, a dust sensor, a fire detection sensor, a carbon dioxide ($CO_2$) sensor, a smoke sensor, a window contact sensor, a water sensor, or any other equivalent sensor. A function of each sensor may be intuitively inferred by one of ordinary skill in the art based on its name, and thus, its detailed description is omitted. Examples of the actions may be, but are not limited to, playing media (audio, video, or the like), capturing the media, purifying the air, performing cooling, or heating of a defined area, controlling lights, sensing various environmental factors (e.g., temperature, smoke, humidity, or the like), and so on.

The plurality of user devices 202a-202n may register with the electronic device 204 by communicating device information, capabilities, and location information over the communication network 206. Alternatively, the user may register the plurality of user devices 202a-202n with the electronic device 204. The device information may include information such as, but are not limited to, an identification value (e.g., device ID information), a device type, and so on of each of the plurality of user devices 202a-202n, and so on. In an example herein, the identification value/device ID information may include information such as, but are not limited to, a Media Access Control (MAC) identifier (MAC ID), a serial number, a unique device ID, and so on. Examples of the capabilities of the user devices 202a-202n may be, but are not limited to, an audio, a video, a display, an energy limit, data sensing capability, and so on. The location information includes information about a location of each of the plurality of user devices 202a-202n.

Also, the user devices 202a-202n may store one or more applications. Examples of the applications may be, but are not limited to, a video streaming application, an audio application, a calendar application, a contact/phonebook application, a weather information related application, e-commerce applications, and so on.

The electronic device 204 referred herein may be a device with which the user may be interacting to perform the one or more actions or to control the one or more user devices 202a-202n to perform the one or more actions. Examples of the electronic device 204 may be, but are not limited to, a smart phone, a mobile phone, a video phone, a computer, a tablet personal computer (PC), a netbook computer, a laptop, a wearable device, a personal digital assistant (PDA), a workstation, a server, an IoT device, or any other user device (202a-202n) with which the user may interact.

The electronic device 204 obtains, stores, and maintains the device information, the capabilities, the location information, or the like of each user device (202a-202n) present in the IoT environment for controlling the one or more actions of the one or more user devices 202a-202n. The electronic device 204 also obtains, determines, or generates a control command for controlling each of the plurality of user devices 202a-202n, by utilizing the device information, the capabilities, the location information, or the like of each user device (202a-202n). The electronic device 204 may transmit the control command to any of the user devices 202a-202n to perform the actions based on the stored capabilities of the respective user devices 202a-202n. The electronic device 204 may receive a result of performing the actions according to the control command from the user devices 202a-202n.

In the MMI/MDE system 200, the plurality of user devices 202a-202n and the electronic device 204 may include a plurality of modality interfaces, which enable the user to interact with the plurality of user devices 202a-202n and the electronic device 204 using a plurality of modalities.

Examples of the modality interfaces may be, but are not limited to, a User Interface (UI) module, a voice assistant module/microphone/speaker, a camera, an eye tracking interface, an input module (e.g., a keyboard, a stylus, a touch screen pen, or the like), a control module (e.g., a remote controller, a joystick, or the like), a sensor for monitoring gestures of the user, an AR input module, or any other interface capable of receiving the supported modalities from the user.

The modalities may include various inputs. Examples of the modalities may include, but are not limited to, a touch/visual/text modality, a voice modality, a bezel modality, a gesture modality, an eye gaze modality, a proprioception modality, an input module based modality, a controller based modality, an AR based modality, or any other input used by the user to interact with the user devices 202a-202n/electronic device 204. In an example, the touch modality includes at least one of, but is not limited to, tap, touch, swipe, zoom, rotate, drag, hold/press, haptic, and so on. In an example, the gesture modality includes at least one of, but is not limited to, hand/palm gestures, head gestures, body gestures, and so on. In an example, the input module based modality includes the inputs provided by the user using the input modules such as, but are not limited to, the inputs provided using the keyboard, the inputs provided using the stylus, and so on. In an example, the controller based modality includes the inputs provided by the user using the controller module. It is understood that embodiments herein may not be limited to the above described modality interfaces and the modalities and may include two or more of various modality interfaces and the modalities (including those described above) at the same time. The above described modality interfaces and the modalities may be intuitively inferred by one of ordinary skill in the art based on its name, and thus, its detailed description is omitted.

The user may interact with the user devices 202a-202n and the electronic device 204 using the single modality. For example, the user may interact with a speaker/voice assistant (an example of the user devices 202a-202n) using a voice modality. Alternatively, the user may interact with the user devices 202a-202n and the electronic device 204 using a combination of the two or more modalities. For example, the user may interact with a mobile phone (an example of the user devices 202a-202n) using a combination of touch/visual and voice modalities. For another example, the user may interact with an AR glass (an example of the user devices 202a-202n) using a combination of eye gaze and voice modalities.

Embodiments herein use the terms such as "modality interfaces", "multimodal interfaces", "inputter", "input interfaces", "communication medium/interfaces", and so on, interchangeably to refer to an interface capable of receiving the inputs/modalities from the user. Embodiments herein use the terms such as "modalities", multimodal inputs", "multimodal perceptions", and so on, interchangeably to refer to inputs used by the user to interact with the user devices 202a-202n and the electronic device 204.

In an embodiment, the electronic device 204 may be configured to suggest the one or more modalities to the user for interacting with the one or more user devices 202a-202n.

For suggesting the one or more modalities, the electronic device 204 identifies an initiation of an interaction by the user with a first device (e.g., the user device 202a) from the plurality of user devices 202a-202n using a first modality from the plurality of modalities. In an embodiment, the electronic device 204 can be the first device 202a. In another embodiment, the electronic device 204 may be a main controller for the user devices 202a-202n, which are dependent user devices. For example, the electronic device 204 may be a smart phone, or the like for the dependent user device like smart buds. The electronic device 204 identifies the initiation of the interaction by the user with the first device 202a and the first modality based on information received from the first user device 202a, the other user devices 202b-202n associated with the user, and so on. For example, when the user touches and long presses a right ear bud to increase a volume of a music being played on the electronic device 204 (herein the electronic device 204 is the main controller device), the electronic device 204 may immediately identifies that the user has initiated the interaction on the right ear bud. Embodiments herein use the terms "first device", "electronic device", "first user device", "source/input user device", "interacting device", and so on, interchangeably to refer to a user device with which the user has initiated the interaction.

The electronic device 204 detects an intent of the user and a state of the user in response to the identified initiated interaction with the first device 202a/204 using the first modality. The intent may depict a cause/purpose of initiating the interaction with the first device 202a/204 using the first modality. Examples of the intent of the user may be, but are not limited to, setting an alarm, initiating a call, checking for a navigation help, trying to play media, clicking pictures/selfies, and so on. The state may depict a current action/condition of the user when the user initiates the interaction with the first device 202a/204 using the first modality. Examples of the state of the user may be, but are not limited to, sleeping, driving, walking, on bed, relaxing, in public, panic, distressed, and so on.

The electronic device 204 detects the intent of the user by analyzing parameters such as, but are not limited to, the first modality, the initiated interaction with the first device 202a/204, an interaction history, data collected from the plurality of user devices 202a-202n associated with the user, and so on. The interaction history depicts monitored interactions of the user with the first device 202a/other user devices 202b-202n and the one or more modalities used by the user to interact with the first device 202a/other user devices 202b-202n, over a time. The data collected from the plurality of user devices 202a-202n may include at least one of, but is not limited to, user parameters, a status of the user devices 202a-202n, a location of the user devices 202a-202n, and so on. Examples of the user parameters may be, but are not limited to, one or more activities/actions being performed by the user, voice utterances of the user, biometrics of the user, a location of the user, a surrounding scene/environment, and so on. The status of the user devices 202a-202n indicates a power ON/OFF state, an idle state, a busy state, or the like, of the user devices 202a-202n, content (e.g., media, text, or the like) being played on the user devices 202a-202n, and so on. For an example, consider that the user navigates few screens (an example of the initiated interaction) on the first device 202a using a touch modality (an example of the first modality). In such a scenario, the electronic device 204 detects the intent of the user as "set an alarm at a bedtime" by analyzing the interaction history (e.g., herein, the interaction history indicates previous night pattern of setting the alarm by the user) and the user parameters. Alternatively, the electronic device 204 detects the intent of the user as "make a call", by analyzing the user parameters collected from a wearable device (an example of the user device (202a-202n)), which depict that the user is in distress.

For another example, consider that the user is inside a car on a driver seat with one hand on a steering wheel, a Global Positioning System (GPS) is suggesting that the car is in fast motion and a gaze of the user is continuously shifting towards a mobile phone that receives a touch input. In such a scenario, the electronic device 204 traces a journey of the touch input of the user, which is leading to a music folder, and accordingly detects that the intent of the user is to certainly play a music.

For detecting the state of the user, the electronic device 204 determines a context of the user based on the user parameters collected from the plurality of user devices 202a-202n associated with the user. The electronic device 204 analyzes the context of the user and the first modality used to initiate the interaction with the first device 202a to detect the state of the user. Consider an example scenario, wherein the electronic device 204 determines the context of the user as "the user is in a driver seat and moving then along with car sensors". In such a scenario, the electronic device 204 detects the state of the user as "driving". Consider another example scenario, wherein the electronic device 204 determines the context as "the user devices 202a-202n associated with the user (such as IoT devices, and wearable devices) are in a bedroom". In such a scenario, the electronic device 204 detects the state of the user as "resting".

For an example, consider that the user is inside a car on a driver seat with one hand on a steering wheel, a GPS is suggesting that the car is in fast motion and a gaze of the user is continuously shifting between a mobile phone and a windscreen. In such a scenario, the electronic device 204 predicts that the user is in a "driving state".

For another example, consider that a smart watch of the user detects a fall, high blood pressure, stress level, and low Oxygen saturation (SpO2). In such a scenario, the electronic device 204 predicts that the user is in a "distress state".

Based on the detected intent and state of the user, the electronic device 204 determines at least one of a second modality from the plurality of modalities and one or more second devices (e.g., 202b-202n) from the plurality of user devices 202a-202n to continue the initiated interaction.

The second modality may be the right/appropriate modality, which may be used by the user to continue the interaction with the first device 202*a*. In an example, the second modality may include the modality from the plurality of modalities other than the first modality. In another example, the second modality may include the first modality. Embodiments herein use the terms such as "second modality", "alternative modality", "output modality", and so on, interchangeably to refer to a modality which may be used by the user to interact naturally with the first device 202*a*.

The one or more second devices 202*b*-202*n* may belong to the user devices 202*a*-202*n* and the one or more second devices 202*b*-202*n* may be determined in order to provide information about the second modality to the user. In an example, the one or more second devices 202*b*-202*n* may include the user devices other than the first device 202*a*. In another example, the one or more second devices 202*b*-202*n* may include the first device 202*a*. Embodiments herein use the terms such as "second devices", "output devices", and so on, interchangeably to refer to user devices through which the second modality may be indicated to the user.

For determining the second modality and the one or more second devices 202*b*-202*n*, the electronic device 204 creates an intent-state pair, based on the detected intent and state of the user corresponding to the initiated interaction with the first device 202*a*. The intent-state pair includes a mapping of the intent with the state of the user detected in relation to initiated interaction with the first device 202*a* using the first modality. The electronic device 204 queries an intent-state-modality mapping database 308 for the created intent-state pair. The intent-state-modality mapping database 308 includes a mapping of the one or more second modalities and the one or more second devices with each of a plurality of intent-state pairs. The electronic device 204 receives information about the second modality and the one or more second devices for the queried intent-state pair from the intent-state-modality mapping database 308. The second modality may be the most suitable/appropriate modality, which may be used by the user to continue the initiated interaction with the first device 202*a*.

Consider an example scenario, wherein the user is trying to play a song on a mobile device (an example of the first device 202*a*) using a touch modality, while driving a car. In such a scenario, the electronic device 204 determines a voice modality as the second modality/appropriate modality and determines a vehicle dashboard as the second device (202*b*-202*n*) for indicating the voice modality to the user. Therefore, the user may use the voice modality to play the song on the mobile device.

The electronic device 204 provides a suggestion to the user to continue the initiated interaction with the first device 202*a* using the determined second modality. The electronic device 204 may provide the suggestion to the user to continue the initiated interaction with the first device 202*a* using the determined second modality, when the determined second modality includes the modality other than the first modality. In an embodiment, the electronic device 204 may provide the suggestion to the user by indicating the second modality on the first device 202*a*. In another embodiment, the electronic device 204 may also provide the suggestion to the user by indicating the second modality on the determined one or more second devices 202*b*-202*n*.

For providing the suggestion to the user, the electronic device 204 extracts a suitable Natural User Interface (NUI) template from a NUI template database 310 with respect to the second modality and device characteristics of the first device 202*a* or the one or more second devices 202*b*-202*n*.

The device characteristics of the device may suggest the kind of capabilities in terms of hardware, or feature sets supported by the device. Examples of the device characteristics may be, but are not limited to, display characteristics, audio capabilities, or the like. In an example, a smart watch (an example of the user devices (202*a*-202*n*) may support a speaker to play a Text to Speech (TTS) response (i.e., the audio capabilities) as an output modality. Alternatively, the smart watch may only support circular watch faces of certain resolution (i.e., the display characteristics). For extracting the NUI template, the electronic device 204 queries the NUI template database 310 by providing the second modality and the device characteristics of the first device 202*a* and/or the one or more second devices 202*b*-202*n* as query inputs. The NUI template database 310 provides the suitable NUI template with respect to the second modality and the device characteristics of the first device 202*a* and/or the one or more second devices 202*b*-202*n* to the electronic device 204.

The NUI template database 310 includes a plurality of library assets and various Finite State Transducers (FSTs). The plurality of library assets may include at least one of, but is not limited to, a library of visual/text assets, a library of voice assets, a library of animation GIF assets, a library of gesture assets, and so on. Each library assets may include a plurality of NUI templates, based on its type. The NUI template may include a template for at least one of text/display text, voice, an animation GIF, an AR three dimensional (3D) content, an UI based content (for logos, symbols, emotions, or the like), a face mesh, and so on. For example, the library of voice assets may include the NUI templates for the voice. For another example, the library of text assets may include the NUI templates for the text. The FSTs select the library of assets for the received second modality and the device characteristics of the first device 202*a* or the one or more second devices 202*b*-202*n* and derive the NUI template from the selected library of assets which matches with the device characteristics of the first device 202*a* or the one or more second devices 202*b*-202*n*. The NUI template database 310 provides the derived NUI template to the electronic device 204, which corresponds to the second modality and the device characteristics of the first device 202*a* or the one or more second devices 202*b*-202*n*.

On extracting the NUI template, the electronic device 204 generates/crafts a promotion content in the extracted NUI template for the second modality. The promotion content may depict the suggestion to the user to continue the interaction with the second modality. The promotion content may include at least one of a display/text content, a conversation, a TTS content, a 3D/AR 3D content, a UI elements based content/3D UI content, media, an animation GIF, vibration signals, and so on. In an example, the 3D content may include at least one of, but is not limited to, a logo, a symbol, a label, an emotion, and so on. In an example, the 3D UI content includes at least one of, but is not limited to, a face mesh, a gesture, and so on.

The electronic device 204 generates the promotion content based on at least one of, but is not limited to, the intent and the state of the user, the second modality, the one or more second devices 202*b*-202*n*, the NUI template (extracted from the NUI template database 310), icons/logos, text, the TTS extracted from various asset libraries, and so on. Embodiments herein user the terms such as "promotion content", "virtual dialog", "suggestion", "output information", "NUI information", and so on, interchangeably to information crafted to indicate the second modality to the user for enhanced multimodal interaction.

Once the promotion content has been generated, the electronic device 204 indicates the promotion content corresponding to the second modality to the user on the first device 202a or the one or more second devices 202b-202n. Thereby, providing the suggestion to the user on the first device 202a or the one or more second devices 202b-202b to continue the interaction with the first device 202a using the second modality. For indicating the promotion content corresponding to the second modality on the first device 202a or the one or more second devices 202b-202n, the electronic device 204 generates a NUI interface/user interface on the first device 202a or the one or more second devices 202b-202n. The electronic device 204 generates the NUI interface on the first device 202a or the one or more second devices 202b-202n based on one or more UI elements supported by the first device 202a or the one or more second devices 202b-202n. Examples of the one or more UI elements may be, but are not limited to, widgets, backgrounds, images, icons, graphics templates, and so on. The electronic device 204 identifies the one or more UI elements supported by the first device 202a or the one or more second devices 202b-202n using a UI element database 312. The UI element database 312 includes information about the various UI elements supported by the plurality of user devices 202a-202n.

The electronic device 204 indicates the promotion content generated in the NUI template corresponding to the second modality on the NUI interface generated on the first device 202a or the one or more second devices 202b-202n. Thus, the user may be aware of the most appropriate modality to interact with the particular user device at a current instance of time, which further enhances an experience of the user.

FIG. 2 shows exemplary blocks of the MDE/MMI system 200, but it is to be understood that other embodiments are not limited thereon. In other embodiments, the MDE/MMI system 200 may include less or more number of blocks. Further, the labels or names of the blocks are used only for illustrative purpose and does not limit the scope of the embodiments herein. One or more blocks can be combined together to perform same or substantially similar function in the MDE/MMI system 200.

Figure 3:
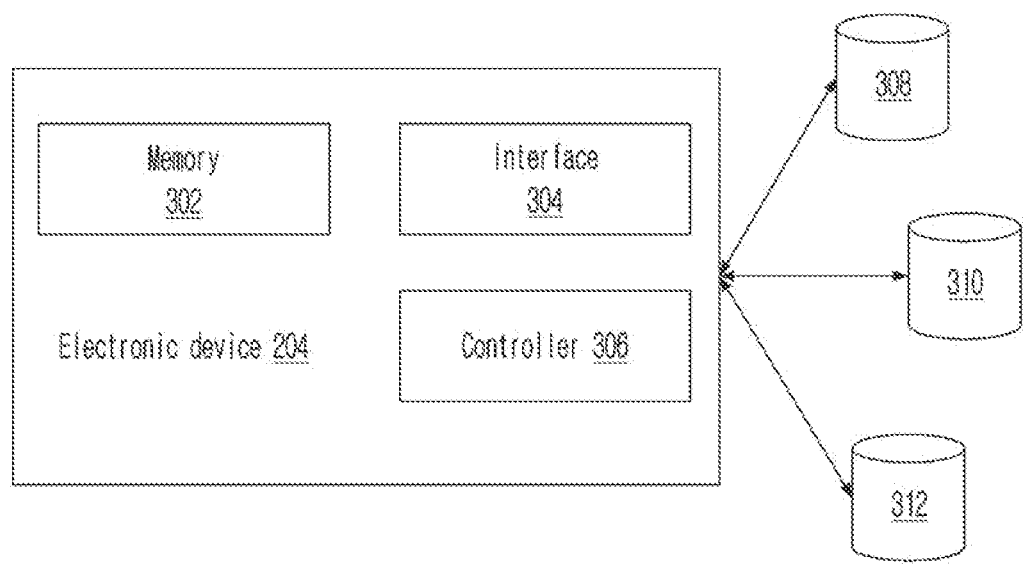
FIG. 3 is a block diagram depicting various components of the electronic device for dynamically suggesting a modality to the user to interact with the user device(s), according to various embodiments.

FIG. 3 is a block diagram depicting various components of the electronic device 204 for dynamically suggesting the modality to the user to interact with the user device(s) (202a-202n), according to various embodiments. The electronic device 204 includes a memory 302, a communication interface 304, and a controller (e.g., a processor) 306. The electronic device 204 may also include an inputter, an outputter, an Input/Output (I/O) module, and so on. The electronic device 204 may also be coupled with the intent-state-modality mapping database 308, the NUI template database 310, and the UI element database 312. The intent-state-modality mapping database 308 includes a mapping of the one or more second modalities and the one or more second devices with each of a plurality of intent-state pairs. The NUI template database 310 comprises the FSTs to map the plurality of NUI templates accessed from the various library of assets with each of the second modalities and each of the device characteristics of the first device 202a, or the one or more second devices 202b-202n. The UI element database 312 includes information about the various UI elements supported by the plurality of user devices 202a-202n.

The memory 302 may store at least one of, but is not limited to, information about the user devices 202a-202n, the plurality of modalities supported by the user devices 202a-202n, the NUI templates, the promotion contents, information about the UI elements supported by the user devices 202a-202n, and so on. The memory 302 may also store a MMI promoter 400, which may be executed by the controller 306 to dynamically suggest the modality to the user to interact naturally with the user devices 202a-202n. For example, the memory 302 may store instructions, and the controller 306 may be configured to execute the instructions to dynamically suggest the modality to the user to interact naturally with the user devices 202a-202n. The memory 302 referred herein may include at least one type of storage medium, from among a flash memory type storage medium, a hard disk type storage medium, a multi-media card micro type storage medium, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 304 may include one or more components which enables the electronic device 204 to communicate with another device (e.g., another electronic device, the plurality of user devices 202a-202n, or the like) using communication methods that have been supported by the communication network 206. The communication interface 304 may include the components such as, a wired communicator, a short-range communicator, a mobile/wireless communicator, and a broadcasting receiver.

The wired communicator may enable the electronic device 204 to communicate with the other devices using the communication methods such as, but are not limited to, wired LAN, the Ethernet, and so on. The short-range communicator may enable the electronic device 204 to communicate with the other devices using the communication methods such as, but are not limited to, Bluetooth low energy (BLE), near field communicator (NFC), WLAN (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transceiver wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 204 may or may not include the broadcasting receiver.

The controller 306 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 306 may be configured to dynamically suggest the appropriate modality to interact with the particular user device (202a-202n). The controller 306 identifies the initiation of the interaction by the user with the first device 202a of the plurality of user devices 202a-202n using the first modality. The controller 306 detects the intent and the state of the user in relation to the initiated interaction with the first device 202a. The controller 306 determines at least one of the second modality and the one or more second devices 202b-202n from the plurality of user devices 202a-202n to continue the interaction with the first device 202a. The controller 306 provides the suggestion to the user to continue the initiated interaction with the first device 202a using the second modality. The controller 306 provides the suggestion to the user by creating the NUI interface on the first device 202a and providing the promotion content corresponding to the second modality on the created NUI interface. Alternatively, the controller 306 provides the suggestion to the user by creating the NUI interface on the one or more second devices 202b-202n and providing the promotion content corresponding to the second modality on the created NUI interface. Thereby, the user may use the appropriate modality to interact with the user device at a current instance of time.

Figure 4:
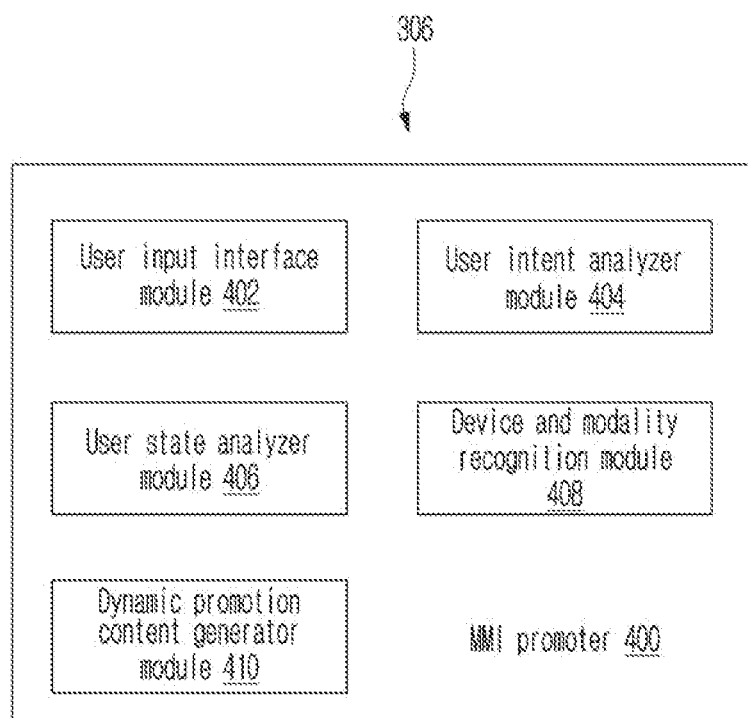
FIG. 4 depicts a MMI promoter performable in the electronic device for dynamically suggesting the modality to the user to interact with the user device(s), according to various embodiments.

As depicted in FIG. 4, the controller 306 executes/processes the MMI promoter 400 for dynamically suggesting the appropriate modality to interact with the particular user device (202a-202n). The MMI promoter 400 includes a user input interface module 402, a user intent analyzer module 404, a user state analyzer module 406, a device and modality recognition module 408, and a dynamic promotion content generator module 410.

The user input interface module 402 may be configured to identify the initiation of the interaction by the user with one of the plurality of user devices 202a-202n (e.g., the first device 202a) and the modality/first modality used by the user to interact with the first device 202a. The user input interface module 402 provides information about the first device 202a and the first modality to the user intent analyzer module 404, the user state analyzer module 406, and the device and modality recognition module 408.

The user intent analyzer module 404 may be configured to detect the intent of the user in response to initiated interaction with the first device 202a using the first modality. The user intent analyzer module 404 may analyze the parameters such as, but are not limited to, the first modality, the initiated interaction with the first device 202a, the interaction history, the data collected from the plurality of user devices 202a-202n associated with the user (i.e., multi-device inputs), and so on to detect the intent of the user.

In an embodiment, the user intent analyzer module 404 may use a first neural network to analyze the parameters such as, but are not limited to, the first modality, the initiated interaction with the first device 202a, the interaction history, the data collected from the plurality of user devices 202a-202n associated with the user (i.e., multi-device inputs), and so on, to detect the intent of the user. The first neural network may be trained to detect the intent of the user. Examples of the first neural network may be, but are not limited to, a convolutional neural network (CNN), a machine learning module, an Artificial Intelligence (AI) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep reinforcement model (with ReLU activation), a deep Q-network, and so on. The first neural network may include a plurality of layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients.

The first neural network may be trained using at least one learning method to detect the intent of the user in response to initiated interaction with the user device (202a-202n). Examples of the learning method may be, but are not limited to, supervised learning, unsupervised learning, semi-supervised learning, reinforcement learning, regression-based learning, and so on. A function associated with the learning method may be performed through the non-volatile memory 302, the volatile memory, and the controller 306. The controller 306 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors may enable the user intent analyzer module 404 to detect the intent of the user in accordance with a predefined operating rule of the first neural network, stored in the non-volatile memory and the volatile memory. The predefined operating rules of the first neural network are provided through training the first neural network using the learning method.

Here, being provided through the learning method means that, by applying the learning method to a plurality of learning data (e.g., training data depicting the parameters collected and monitored for a plurality of interactions initiated between the user and the user devices, and the associated intent), a predefined operating rule or AI model of a desired characteristic is made. Detecting the intent of the user may be performed in the electronic device 204 itself in which the network learning according to an embodiment is performed, and/or may be implemented through a separate server/system.

On detecting the intent of the user, the user intent analyzer module 404 provides information about the intent of the user to the device and modality recognition module 408.

The user state analyzer module 406 may be configured to detect the state of the user in response to the initiated interaction with the first device 202a using the first modality. The user state analyzer module 406 is described in FIG. 5.

Figure 5:
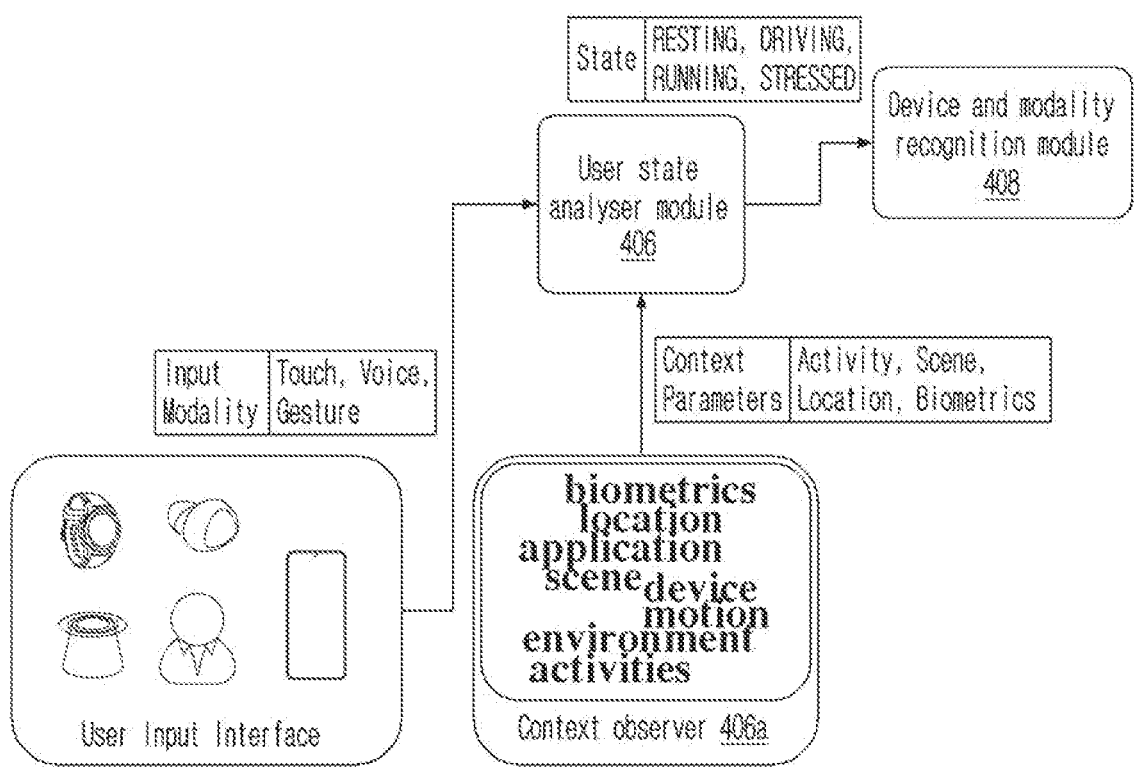
FIG. 5 depicts a user state analyzer module for detecting a state of the user in relation to an initiated interaction, according to various embodiments.

As depicted in FIG. 5, the user state analyzer module 406 includes a context observer 406a. The context observer 406a may be configured to receive information about the first modality used by the user to interact with the first device 202a and the user parameters collected from the user devices 202a-202n, and to determine the context of the user/context parameters by analyzing the received information about the first modality and the user parameters. In an example herein, the context parameters may include at least one of an activity, a scene, a location, biometrics, or the like.

On determining the context parameters, the user state analyzer module 406 analyzes the context parameters and the information about the first modality to detect the state of the user in relation to the identified interaction with the first device 202a. In an example herein, the user state analyzer module 406 detects the state of the user as at least one of, but is not limited to, "resting", "driving", "running", "stressed", "sleeping", and so on. In an embodiment, the user state analyzer module 406 may use a second neural network/AI model to analyze the context parameters and the information about the first modality to detect the state of the user. The second neural network may be a trained model to detect the state of the user. Details of the second neural network may correspond to the first neural network, thus a repeated description is omitted for conciseness.

On detecting the state of the user, the user state analyzer module 404 provides information about the state of the user to the device and modality recognition module 408.

Figure 6:
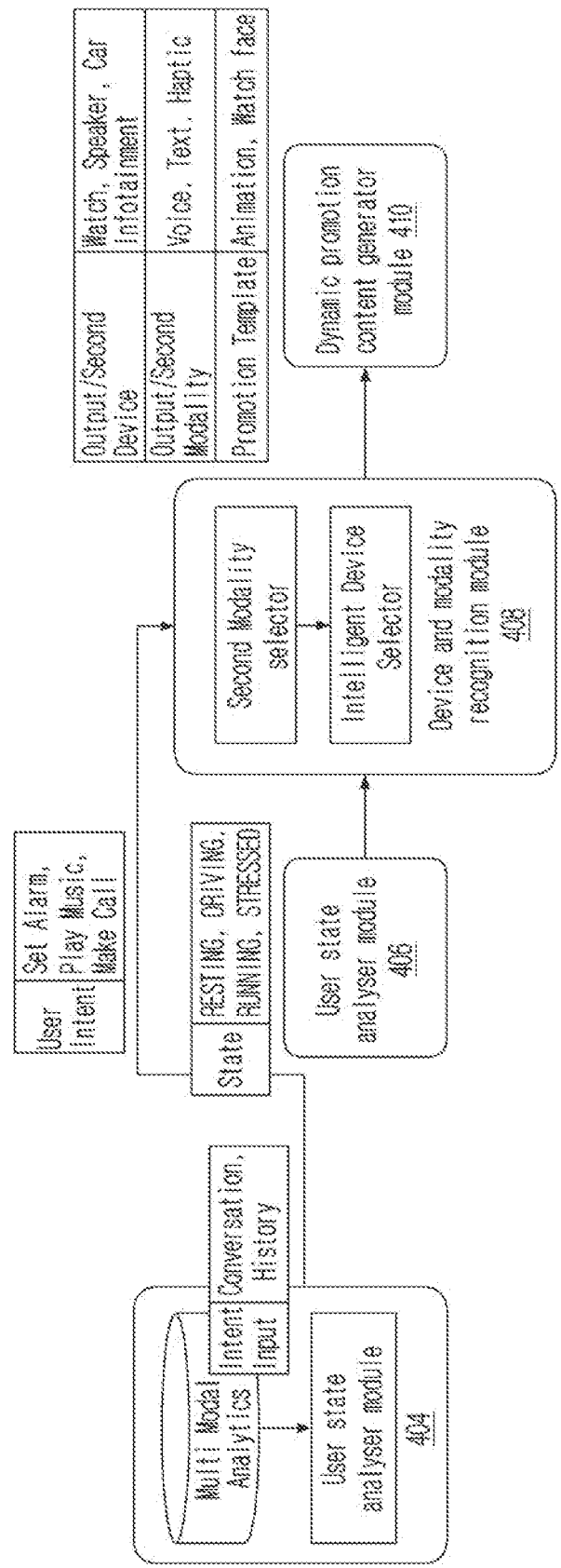
FIG. 6 depicts a device and modality recognition module for determining a second modality for continuing the initiated interaction and one or more second devices for handling the second modality, according to various embodiments.

The device and modality recognition module 408 may be configured to determine at least one of the second modality and the one or more second devices 202b-202n to continue the initiated interaction with the first device 202a. The device and modality recognition module 408 is described in FIG. 6. As depicted in FIG. 6, the device and modality recognition module 408 receives information about the intent of the user (such as, "play music", "set alarm", "make call", or the like) and the state of the user (such as, "driving", "sleeping", "resting", "stressed", or the like) and creates the intent-state pair. The device and modality recognition module 408 determines the second modality and the one or more second devices 202b-202n for the created intent-state pair by accessing the intent-state-modality mapping database 308.

Consider an example scenario, wherein the user is in relaxed state during sleeping hours. In such a scenario, the device and modality recognition module 408 determines a watch face without any sound as the second modality of interaction. Consider another example scenario, wherein the user is driving. In such a scenario, the device and modality recognition module 408 determines a voice/audio modality as the second modality without any display to avoid distractions. Consider another example scenario, wherein the user is inside a car, but not driving. In such a scenario, the device and modality recognition module 408 determines a combination of voice/audio and visual modalities as the second modality.

Consider an example scenario, wherein the user has a smart watch and a mobile phone, and the user is in a relaxed state and in bed. In such a scenario, the device and modality recognition module 408 determines the smart watch as the second device.

Consider an example scenario, wherein the user has a smart watch and a mobile phone, and the user is driving a car. In such a scenario, the device and modality recognition module 408 determines a car entertainment unit as the second device.

Consider an example scenario, wherein the user has a smart watch and a mobile phone, and the user is driving a car and is in a private moment. In such a scenario, the device and modality recognition module 408 determines a car entertainment unit as the second device.

The device and modality recognition module 408 provides information about the second modality, the one or more second devices 202b-202n, the NUI template supported by the first device 202a or the one or more second devices 202b-202n, or the like, to the dynamic promotion content generator module 410.

Figure 7A:
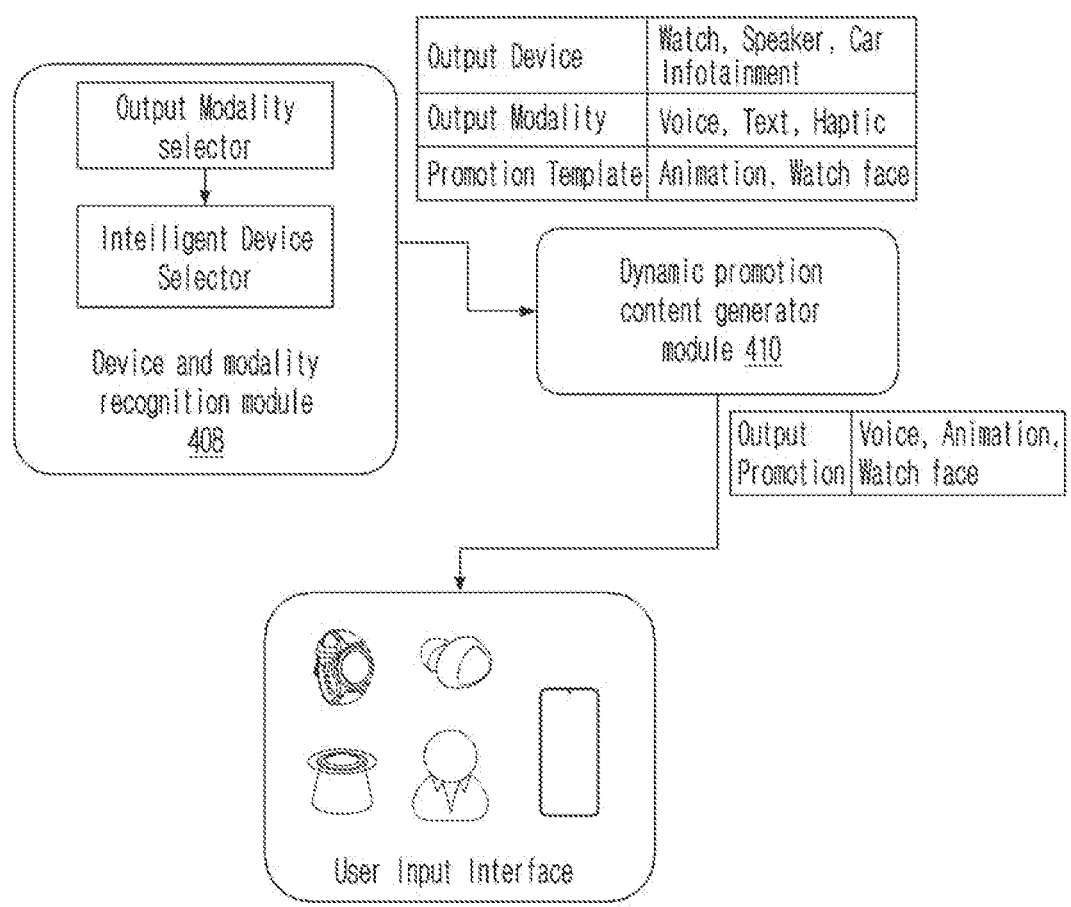
FIGS. 7A and 7B depict a dynamic promotion content generation module for generating a promotion content which depicts a suggestion to the user to continue the interaction using the second modality, according to various embodiments.

The dynamic promotion content generator module 410 may be configured to provide the suggestion to the user to continue the initiated interaction with the first device 202a using the second modality. The dynamic promotion content generator module 410 is described in FIGS. 7A and 7B. As depicted in FIG. 7A, the dynamic promotion content generator module 410 generates the promotion content for the second modality using the NUI template. The dynamic promotion content generator module 410 provides the suggestion to the user to continue the initiated interaction with the first device 202a using the second modality, by indicating the promotion content generated for the second modality on the first device 202a or the one or more second devices 202b-202n. In an example, for the same modality, the dynamic promotion content generator module 410 may dynamically generate the different promotion contents for the different user devices 202a-202n. For example, for the same second modality (e.g., a text modality), the electronic device 204 generates the different promotion contents for a mobile phone, an AR glass, a watch, a vehicle/car dashboard, or the like (examples of the first device 202a and the one or more second devices 202b-202n). Generating the promotion content and indicating the promotion content on the first device 202a or the one or more second devices are described in FIG. 7B.

Figure 7B:
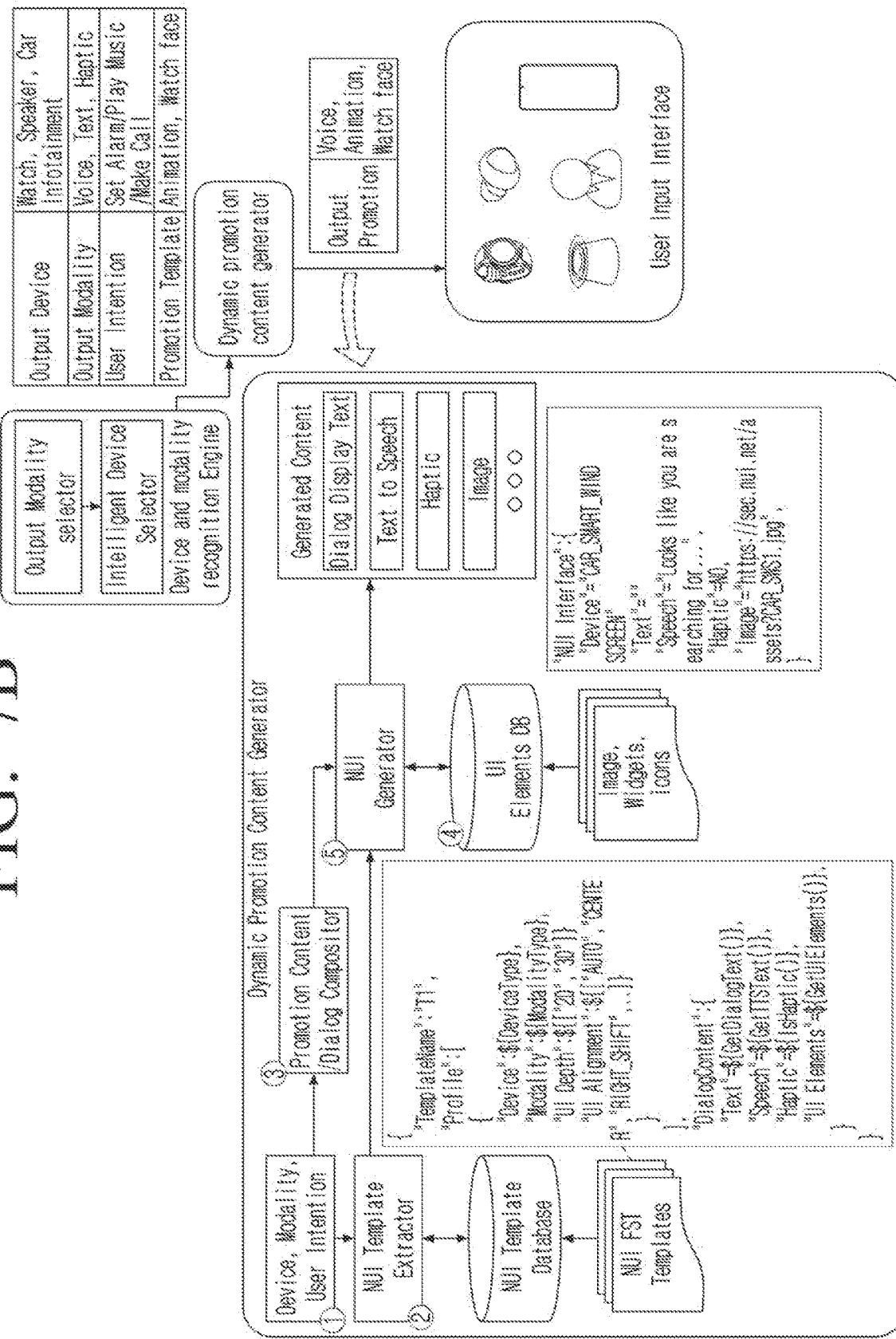

As depicted in FIG. 7B, in step 1, the dynamic promotion content generator module 410 receives information about the first device 202a, the intent of the user, the state of the user, and the second modality, and the one or more second devices 202b-202n from the user input interface module 402, the user intent analyzer module 404, the user state analyzer module 406, and the device and modality recognition module 408, respectively.

In step 2, the dynamic promotion content generator module 410 extracts the NUI template from the NUI template database 310 with respect to the second modality and the device characteristics of the first device 202a or the one or more second devices 202b-202n.

In step 3, the dynamic promotion content generator module 410 generates the promotion content/dialog in the extracted NUI template based on at least one of but is not limited to, the intent and the state of the user, the second modality, the one or more second devices 202b-202n, and so on.

Once the promotion content has been generated, in step 4, the dynamic promotion content generator module 410 generates the NUI on the first device 202a or the one or more second devices 202b-202n. The dynamic promotion content generator module 410 generates the NUI on the first device 202a or the one or more second devices 202b-202n by identifying the one or more UI elements supported by the first device 202a or the one or more second devices 202b-202n using the UI element database 312.

In step 5, the dynamic promotion content generator module 410 provides the promotion content generated in the NUI template corresponding to the second modality on the NUI generated on the first device 202a or the one or more second devices 202b-202n. In an example, the promotion content may be at least one of a dialog display text, a TTS content, a haptic content, an image, or the like.

FIGS. 3 and 4 show exemplary blocks of the electronic device 204, but it is to be understood that other embodiments are not limited thereon. In other embodiments, the electronic device 204 may include less or more number of blocks. Further, the labels or names of the blocks are used only for illustrative purpose and does not limit the scope of the embodiments herein. One or more blocks can be combined together to perform same or substantially similar function in the electronic device 204.

Figure 8:
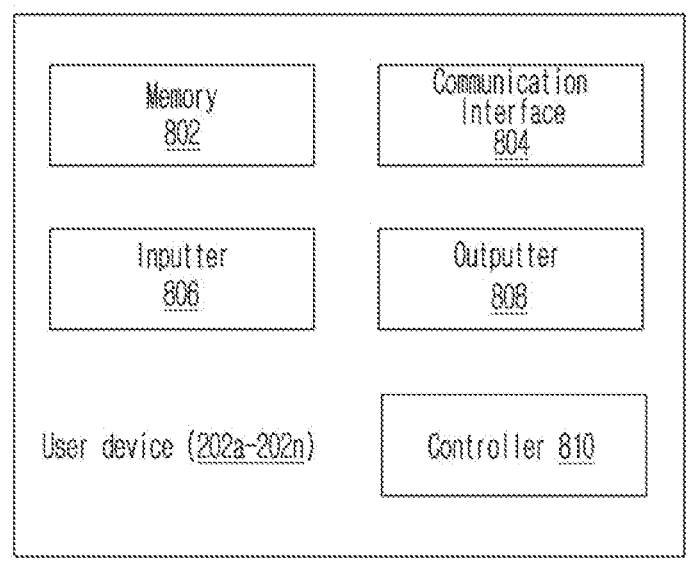
FIG. 8 is an example block diagram depicting components of the user device, according to various embodiments.

FIG. 8 is an example block diagram depicting components of the user device (including the first device 202a or the second device 202b-202n), according to various embodiments. The user device (202a-202n) includes a memory 802, a communication interface 804, an inputter 806, an outputter 808, and a controller 810.

The memory 802 may store at least one of, but is not limited to, the user parameters collected by monitoring the user(s), the device characteristics, and so on. The memory 802 referred herein may include at least one type of storage medium, from among a flash memory type storage medium, a hard disk type storage medium, a multi-media card micro type storage medium, a card type memory (e.g., an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 804 may include one or more components which enables the user device (202a-202n) to communicate with the electronic device 204 using communication methods that have been supported by the communication network 206.

The inputter 806 may be configured to receive the modality from the user to interact with the user device (202a-202n). The inputter 806 may support the one or more modality interfaces to receive the modality from the user. The inputter 806 may provide the information about the user device (202a-202n) and the modality used by the user to the interact with the user device (202a-202n) to the electronic device 204.

The outputter 808 may be configured to receive the promotion content related to the alternative/second modality from the electronic device 204 and to indicate the received promotion content on the NUI configured/generated by the electronic device 204 on the user device (202a-202n).

The controller 810 may include at least one of a single processer, a plurality of processors, multiple homogeneous or heterogeneous cores, multiple Central Processing Units (CPUs) of different kinds, microcontrollers, special media, and other accelerators. The controller 810 may be configured to control all the components (802-808) of the user device (202a-202n). The controller 810 may also be configured to perform the one or more actions, based on the interaction of the user with the user device (202a-202n).

The controller 810 may also be configured to suggest the modality to the user to interact with the user devices 202a-202n. The controller 810 may suggest the modality to the user by performing steps similar to the steps performed by the controller 306 of the electronic device 204, thus a repeated description is omitted for conciseness.

FIG. 8 shows exemplary blocks of the user device (202a-202n), but it is to be understood that other embodiments are not limited thereon. In other embodiments, the user device (202a-202n) may include less or more number of blocks. Further, the labels or names of the blocks are used only for illustrative purpose and does not limit the scope of the embodiments herein. One or more blocks can be combined together to perform same or substantially similar function in the user device (202a-202n).

Figure 9:
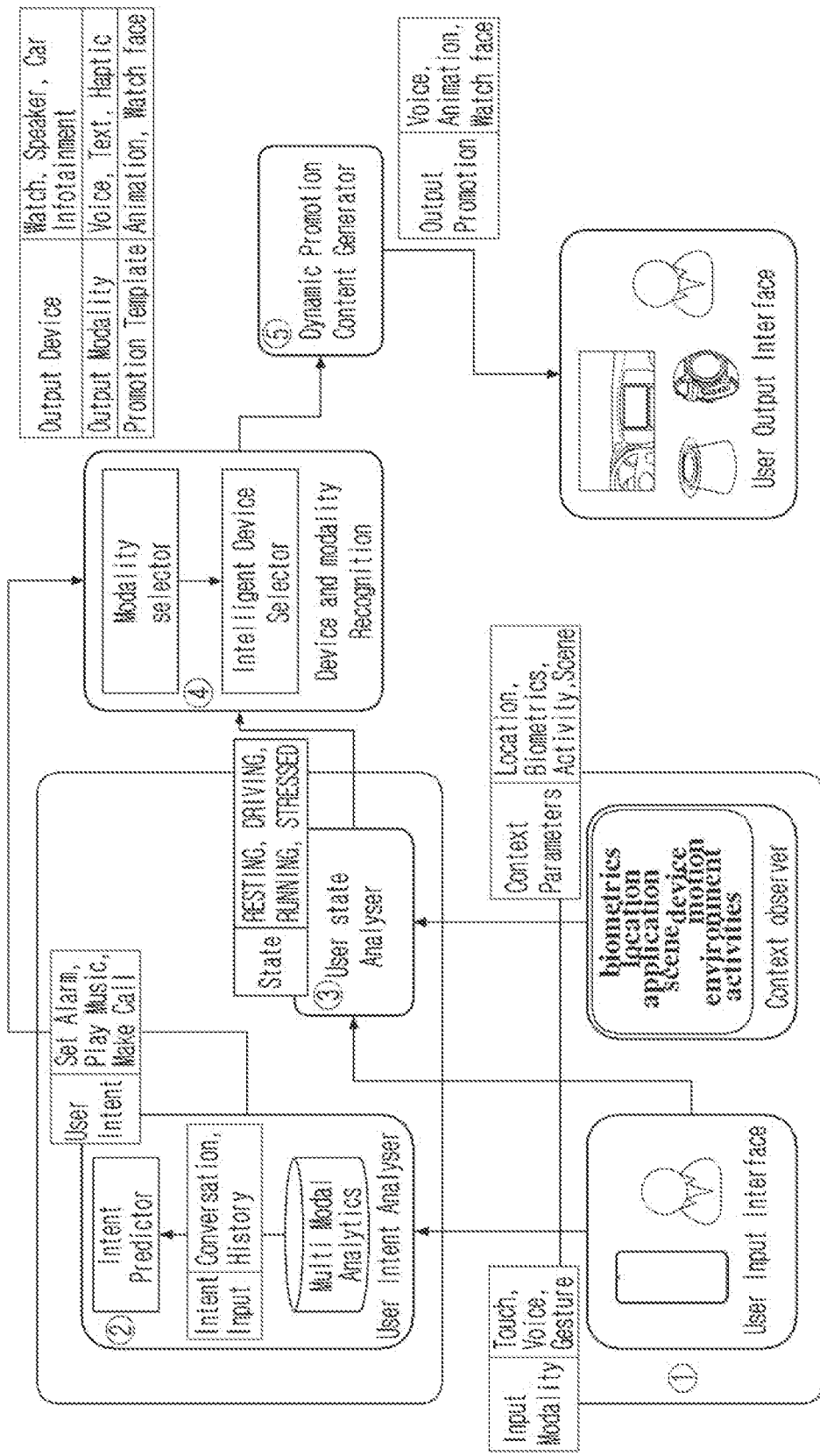
FIG. 9 is an example conceptual diagram depicting suggestion of the modality to the user to interact with the electronic device, according to various embodiments.

FIG. 9 is an example conceptual diagram depicting suggestion of the modality to the user to interact with the electronic device 204, according to various embodiments.

At step 1, the electronic device 204 identifies the initiation of the interaction by the user with the first device 202a and the first modality (e.g., a touch modality, a voice modality, a gesture modality, or the like) used by the user to interact with the first device 202a.

At step 2, the electronic device 204 detects the intent of the user (e.g., "set alarm", "play music", "make call") in relation to the initiated interaction with the first device 202a. The electronic device 204 detects the intent of the user based on at least one of the first device 202a, the first modality, the interaction history, the data collected from the one or more user devices 202a-202n associated with the user, and so on.

At step 3, the electronic device 204 detects the state of the user (e.g., "resting", "driving", "running", "stressed", or the like) in relation to the initiated interaction with the first device 202a. The electronic device 204 determines the context of the user/context parameters based on the data collected from the one or more user devices 202a-202n, wherein the data includes the user parameters. The electronic device 204 analyzes the context of the user to detect the state of the user.

At step 4, the electronic device 204 determines the second modality (e.g., "voice", "text", "haptic", or the like), the one or more second devices 202b-202n (e.g., "watch", "speaker", "vehicle/car infotainment", or the like), and the NUI template (e.g., "animation", "watch face", or the like). The electronic device 204 determines the second modality, and the one or more second devices 202b-202n, based on the intent and state of the user and the data collected from the user devices 202a-202n, or the like.

At step 5, the electronic device 204 generates the promotion content for the second modality. The electronic device 204 extracts the NUI template from the NUI template database 310 with respect to the second modality and the device characteristics of the first device 202a or the one or more second devices 202b-202n. The electronic device 204 generates the promotion content for the second modality in the extracted NUI template. On generating the promotion content, the electronic device 204 generates/creates the NUI on the first device 202a or the one or more second devices 202b-202n. The electronic device 204 then provides the suggestion to the user to continue the initiated interaction with the first device 202a using the second modality, by indicating the promotion content corresponding to the second modality on the NUI generated on the first device 202a or the one or more second devices 202b-202n.

Consider an example, wherein the user initiates the interaction with a mobile phone (an example of the first device 202a) using a touch modality (an example of the first modality). In such a scenario, the electronic device 204 detects the intent and the state of the user in relation to the initiated interaction with the mobile phone. Based on the detected intent and state of the user, the electronic device 204 determines a voice modality as the second modality to continue the interaction with the mobile phone and a speaker, and a smart car dashboard as the second devices 202b-202n. The electronic device 204 generates the promotion content for the voice modality. The electronic device 204 provides the suggestion to the user to continue the interaction with the mobile phone with the voice modality, by indicating the promotion content corresponding to the voice modality on the mobile phone or the smart ear buds or the smart car dashboard.

Figure 10:
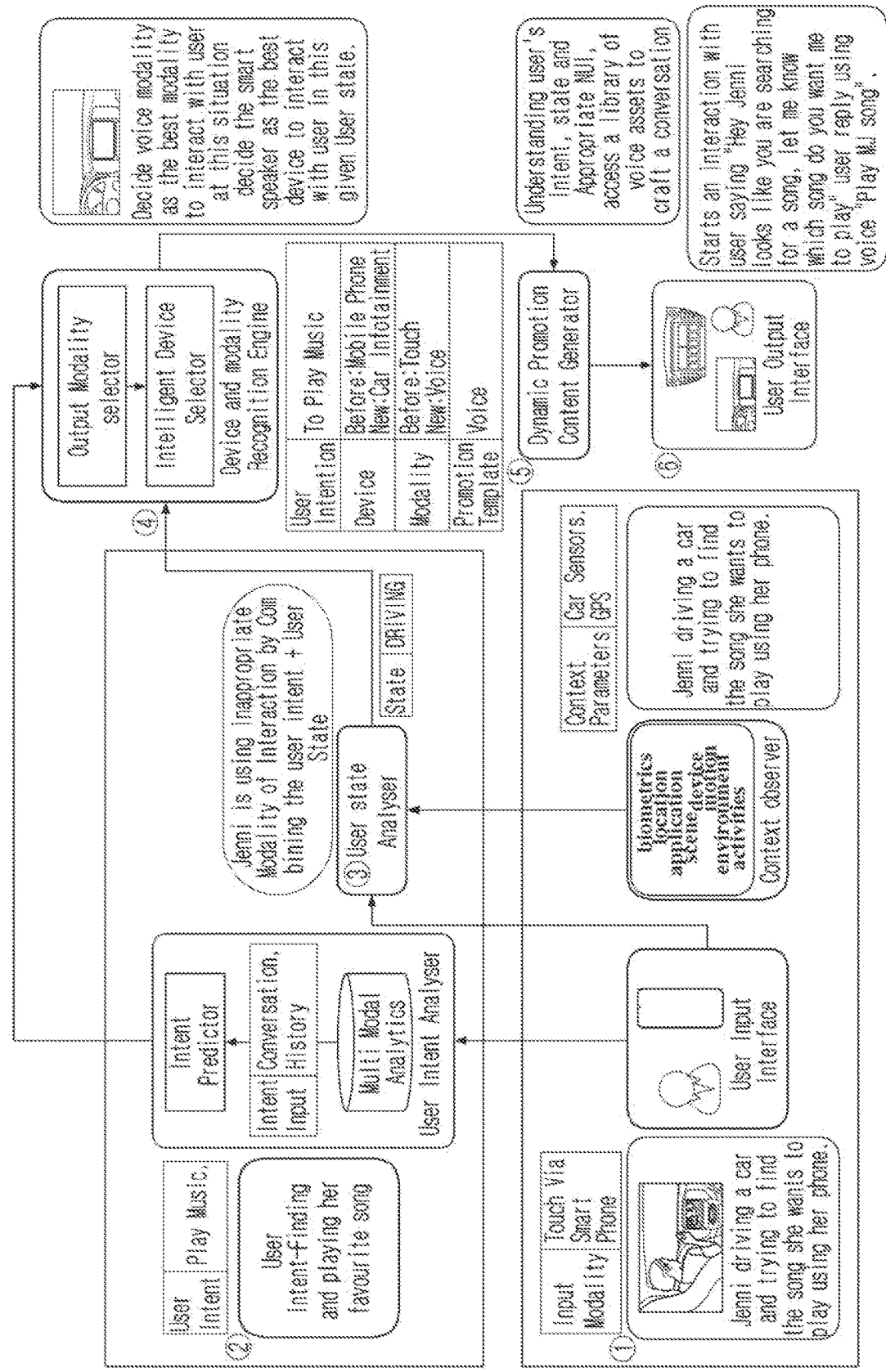
FIG. 10 is an example diagram depicting a use case scenario of suggesting the modality of interaction to the user while driving a car, according to various embodiments.

FIG. 10 is an example diagram depicting a use case scenario of suggesting the modality of interaction to the user while driving a car, according to various embodiments.

Consider an example scenario, wherein at step 1, a user, Jenni while driving a car initiates the interaction with a mobile phone (an example of the first device 202a) using a touch modality (an example of the first modality) to find and play a song. In such a scenario, at step 2, the electronic device 204 detects the current intent of the user as "play music". At step 3, the electronic device 204 collects the user parameters from the user devices 202a-202n associated with the user. Based on the collected user parameters, the electronic device 204 identifies that "the user is driving a car and trying to find the song to play using the mobile phone" and accordingly, determines "car sensors", and "Global Positioning System (GPS)" as the context parameters. The electronic device 204 analyzes the context parameters and detects the state of the user as "driving". Based on the detected intent and state of the user, the electronic device 204 determines that the user is using an inappropriate modality to interact with the mobile phone while driving the car.

At step 4, the electronic device 204 selects a car infotainment system as the second device and a voice modality as the alternative/second modality to continue the interaction with the mobile phone, based on the detected intent and state of the user.

At step 5, the electronic device 204 crafts the promotion content/conversation corresponding to the voice modality. For crafting the conversation, the electronic device 204 extracts the NUI template from the library of voice assets present in the NUI template database 310. The electronic device 204 crafts the conversation in the extracted NUI template, based on the second modality, the second device, and the intent and state of the user. The electronic device 204 generates the NUI on the car infotainment system to indicate the promotion content/conversation to the user, which suggests the user to continue the interaction with the mobile phone using the voice modality. In an example herein, the crafted promotion content/conversation may be "Hey Jenni looks like you are searching for a song, let me know which song you want me to play". Therefore, the user may provide a reply like "play MJ song" using the voice modality, which further prevents any road accidents or distractions that may occur due to the interaction of the user with the mobile phone using the touch modality while driving the car.

Figure 11A:
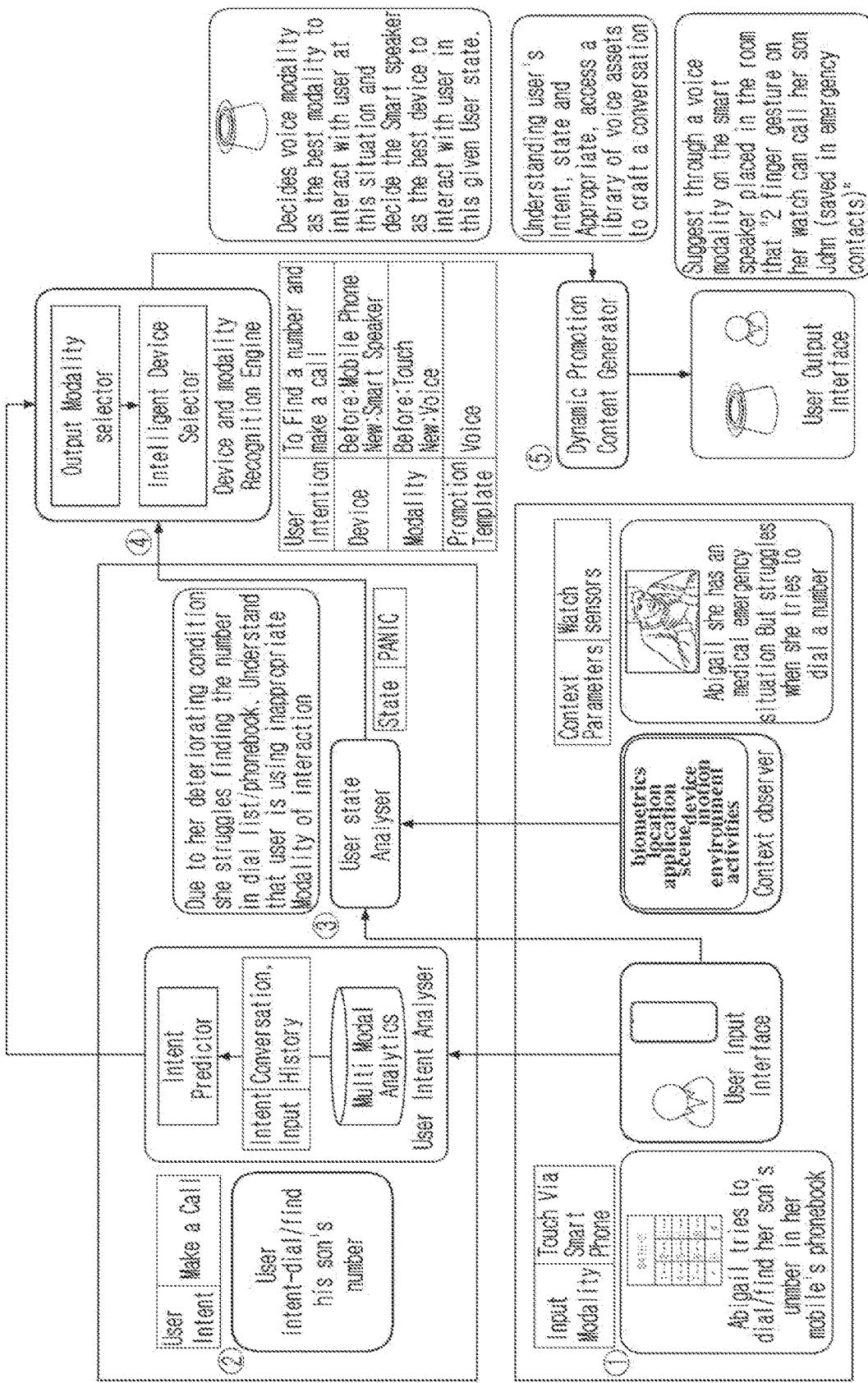
FIG. 11A is an example diagram depicting a use case scenario of suggesting the modality of interaction to the user, when the user in a deteriorating condition, according to various embodiments.

FIG. 11A is an example diagram depicting a use case scenario of suggesting the modality of interaction to the user, when the user in a deteriorating condition, according to various embodiments.

Consider an example scenario, wherein at step 1, a user, Abigail, initiates the interaction with a mobile phone (an example of the first device 202a) using a touch modality (an example of the first modality) to dial/find her son's number in a mobile's phonebook. In such a scenario, at step 2, the electronic device 204 detects the current intent of the user as "make call". At step 3, the electronic device 204 collects the user parameters from the user devices 202a-202n associated with the user. Based on the collected user parameters, the electronic device 204 identifies that "the user has a medical emergency situation and the user struggles to find and dial a number" and accordingly determines "watch", and "sensors" as the context parameters. The electronic device 204 analyzes the context parameters and detects the state of the user as "panic". Based on the detected intent and state of the user, the electronic device 204 determines that the user struggles to find her son's number in the phonebook due to her deteriorating condition and further determines that the user is using an inappropriate modality of interaction.

At step 4, the electronic device 204 selects a speaker and a watch as the second devices and a voice modality and a gesture modality as the alternative/second modalities to continue the interaction, based on the detected intent and state of the user.

At step 5, the electronic device 204 crafts the promotion contents corresponding to the voice modality and the gesture modality and provides the suggestion to the user to continue the interaction using the combination of the voice and gesture modalities, by indicating the crafted promotion contents on the speaker and the watch.

Figure 11B:
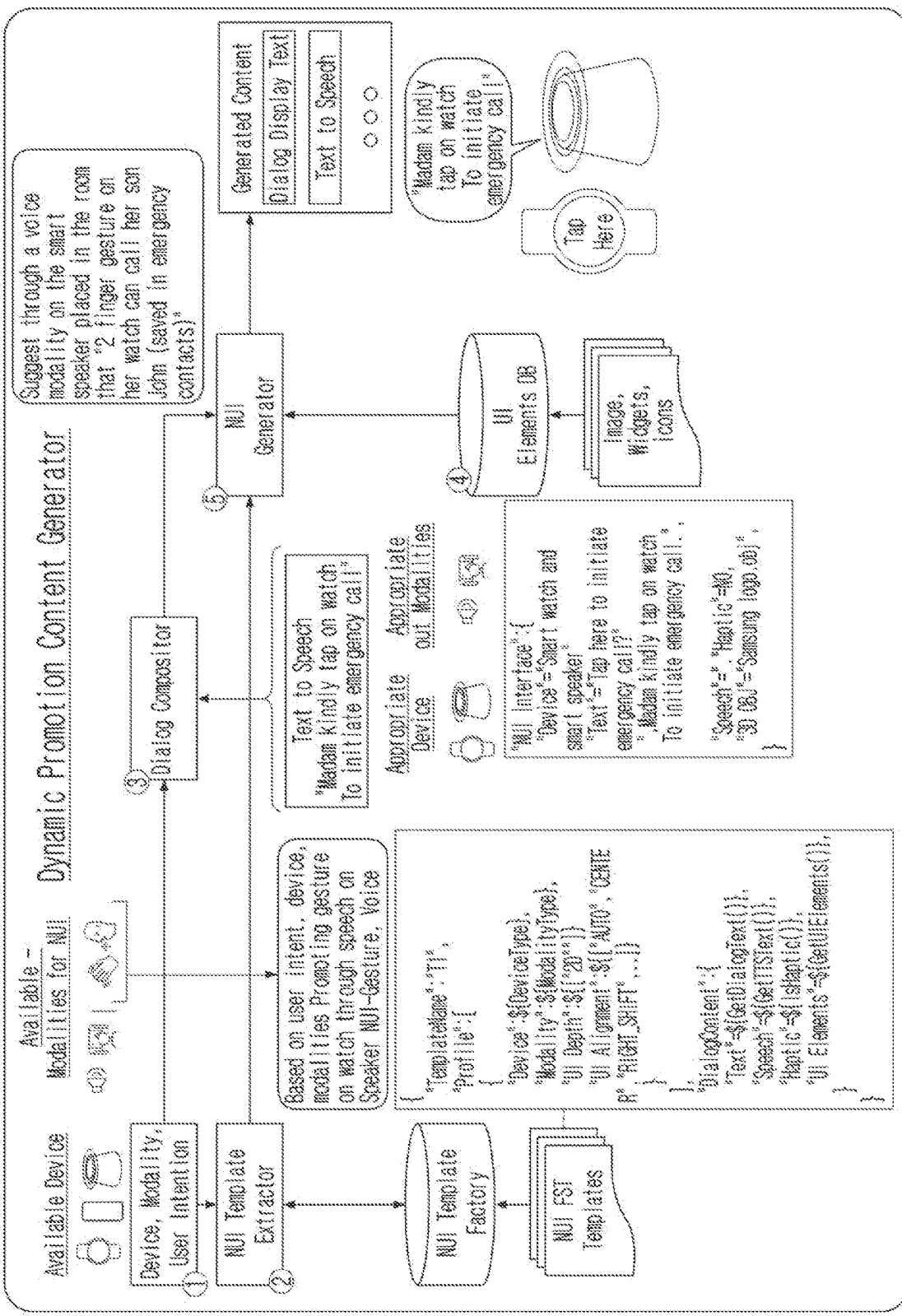
FIG. 11B is an example diagram depicting a use case scenario of crafting the promotion content and indicating the crafted promotion content to the user for interaction, when the user in the deteriorating condition, according to various embodiments.

Crafting the promotion contents/conversation and indicating the crafted promotion contents are depicted in FIG. 11B. As depicted in FIG. 11B, for crafting the promotion content, at step 1, the electronic device 204 identifies the mobile device as the first device 202a, the voice and gesture modalities as the determined/available modalities, and the intent and state of the user. At step 2, the electronic device 204 extracts the NUI template from the library of voice assets and the NUI template from the library of gesture assets present in the NUI template database 310. At step 3, The electronic device 204 crafts the promotion content (e.g., a text to speech content) like "Madam Kindly tap on watch to initiate emergency call" in the NUI template extracted from the library of voice assets, based on the second modality, the second device, and the intent and state of the user. The electronic device 204 also crafts the promotion content like a "2 finger gesture" in the NUI template extracted from the library of gesture assets. At step 4, the electronic device 204 generates the NUI (supporting the gesture modality) on the watch of the user and the NUI (supporting the voice modality) on the speaker, based on the UI elements supported by the watch and the speaker respectively. At step 5, the electronic device 204 indicates the crafted promotion content "2 finger gesture" on the NUI generated on the watch. The electronic device 204 also indicate the promotion content "Madam Kindly tap on watch to initiate emergency call" to the user using the NUI generated on the speaker. Thereby, the user can tap on the "2 finger gesture" on her watch to call her son (which is saved in emergency contacts).

Figure 12:
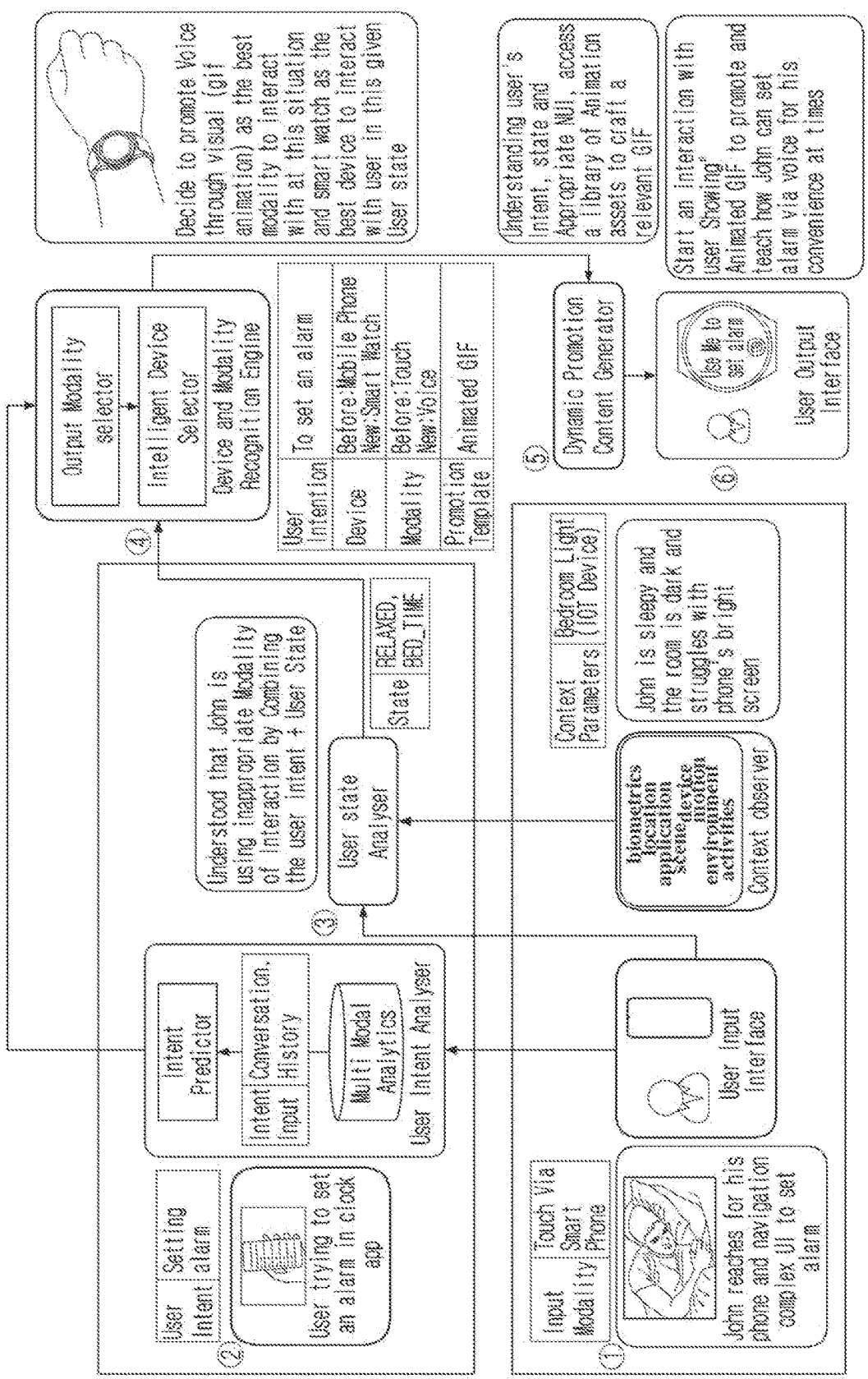
FIG. 12 is an example diagram depicting a use case scenario of suggesting the modality of interaction to the user for setting an alarm at bedtime, according to various embodiments.

FIG. 12 is an example diagram depicting a use case scenario of suggesting the modality of interaction to the user for setting an alarm at bedtime, according to various embodiments.

Consider an example scenario, wherein at step 1, a user, John reaches for a mobile phone (an example of the first device 202a) and initiates an interaction with the mobile phone using a touch modality/first modality (e.g., navigating a complex UI on the mobile phone) to set an alarm. In such a scenario, at step 2, the electronic device 204 detects the current intent of the user as "setting alarm". At step 3, the electronic device 204 collects the user parameters from the user devices 202a-202n associated with the user. Based on the collected user parameters, the electronic device 204 identifies that "the user is sleepy, and a room is dark and struggles with phone's bright screen" and accordingly determines the context parameters like "bedroom light". The electronic device 204 analyzes the context parameters and detects the state of the user as "relaxed, bedtime". Based on the detected intent and state of the user, the electronic device 204 determines that the user is using an inappropriate modality of interaction for setting the alarm.

Based on the detected intent and state of the user, at step 4, the electronic device 204 selects a smart watch as the second device and a voice as the second modality, through visual (animation GIF) modality, to continue the interaction for setting the alarm.

At step 5, the electronic device 204 crafts the promotion content/animation GIF corresponding to the voice through visual modality. For crafting the animation GIF, the electronic device 204 extracts the NUI template from the library of animation assets present in the NUI template database 310. The electronic device 204 crafts the animation GIF in the extracted NUI template, based on the second modality, the second device, and the intent and state of the user. The electronic device 204 generates the NUI on the smart watch to indicate the animation GIF to the user, which suggests the user to how to set the alarm via the voice modality.

Figure 13A:
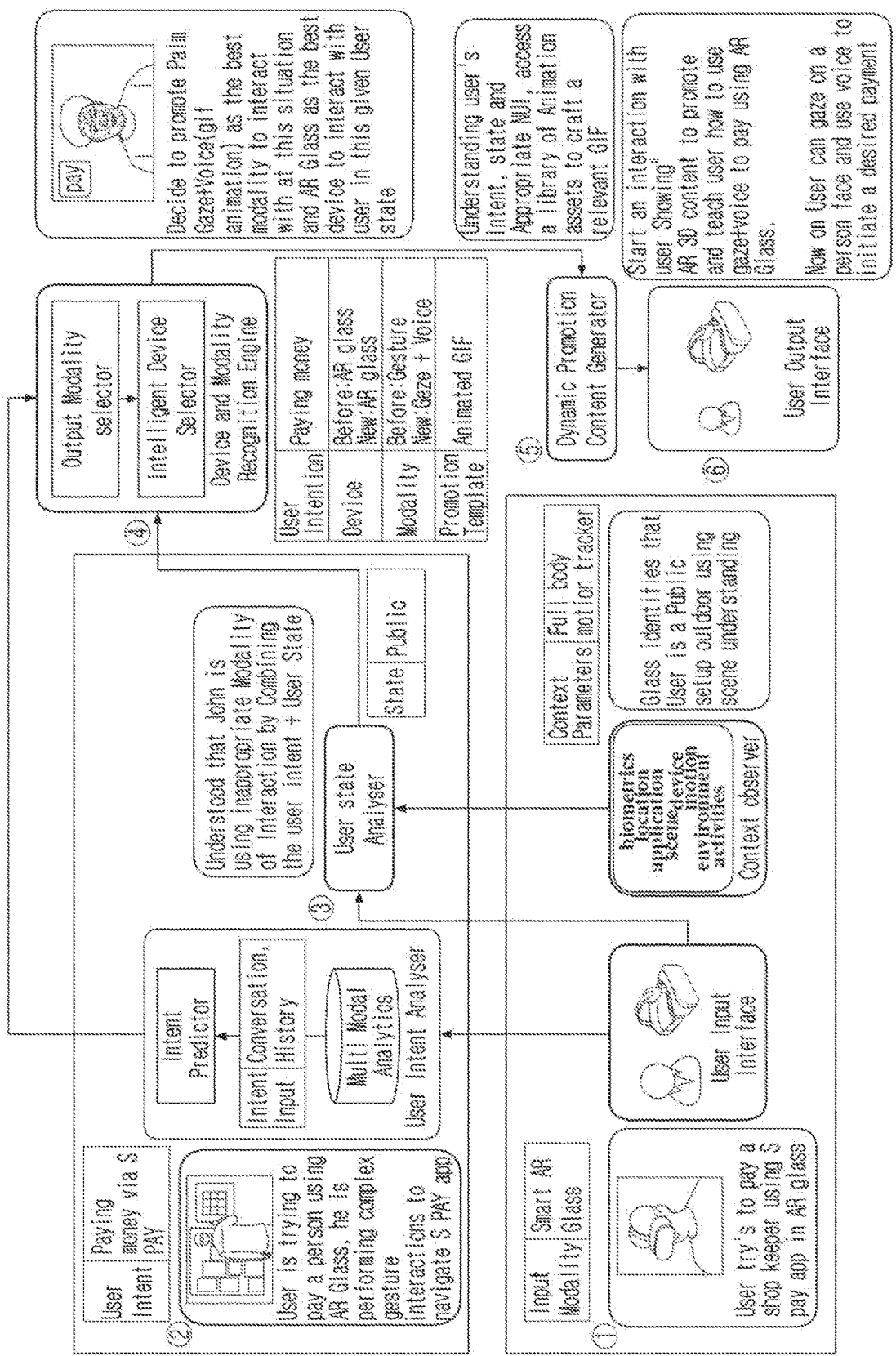
FIG. 13A is an example diagram depicting a use case scenario of suggesting the modality of interaction to the user for making a money payment using an Augmented Reality (AR) glass, according to various embodiments.

FIG. 13A is an example diagram depicting a use case scenario of suggesting the modality of interaction to the user for making a money payment using an AR glass, according to various embodiments.

Consider an example scenario, wherein at step 1, a user tries to make a money payment to a shopkeeper using a S pay application (app) in an AR glass (an example of the first device 202a) by performing gestures (an example of the first modality). In such a scenario, at step 2, the electronic device 204 detects the current intent of the user as "paying money via S pay". At step 3, the electronic device 204 collects the user parameters from the user devices 202a-202n associated with the user, which depicts that "the user is in a public/outdoor". Based on the collected user parameters, the electronic device 204 determines the context parameters as "full body motion tracker", and accordingly detects the state of the user as "public". Based on the intent and state of the user, the electronic device 204 identifies that the user is using the inappropriate modality of interaction for making the money payment.

At step 4, the electronic device 204 selects the AR glass as the second modality and a combination of a gaze and voice modalities as the second modality to continue the interaction, based on the detected intent and state of the user.

At step 5, the electronic device 204 crafts the promotion content corresponding to the combination of the gaze and voice modalities and provides the suggestion to the user to continue the interaction using the combination of the gaze and voice modalities, by indicating the crafted promotion content on the AR glass.

Figure 13B:
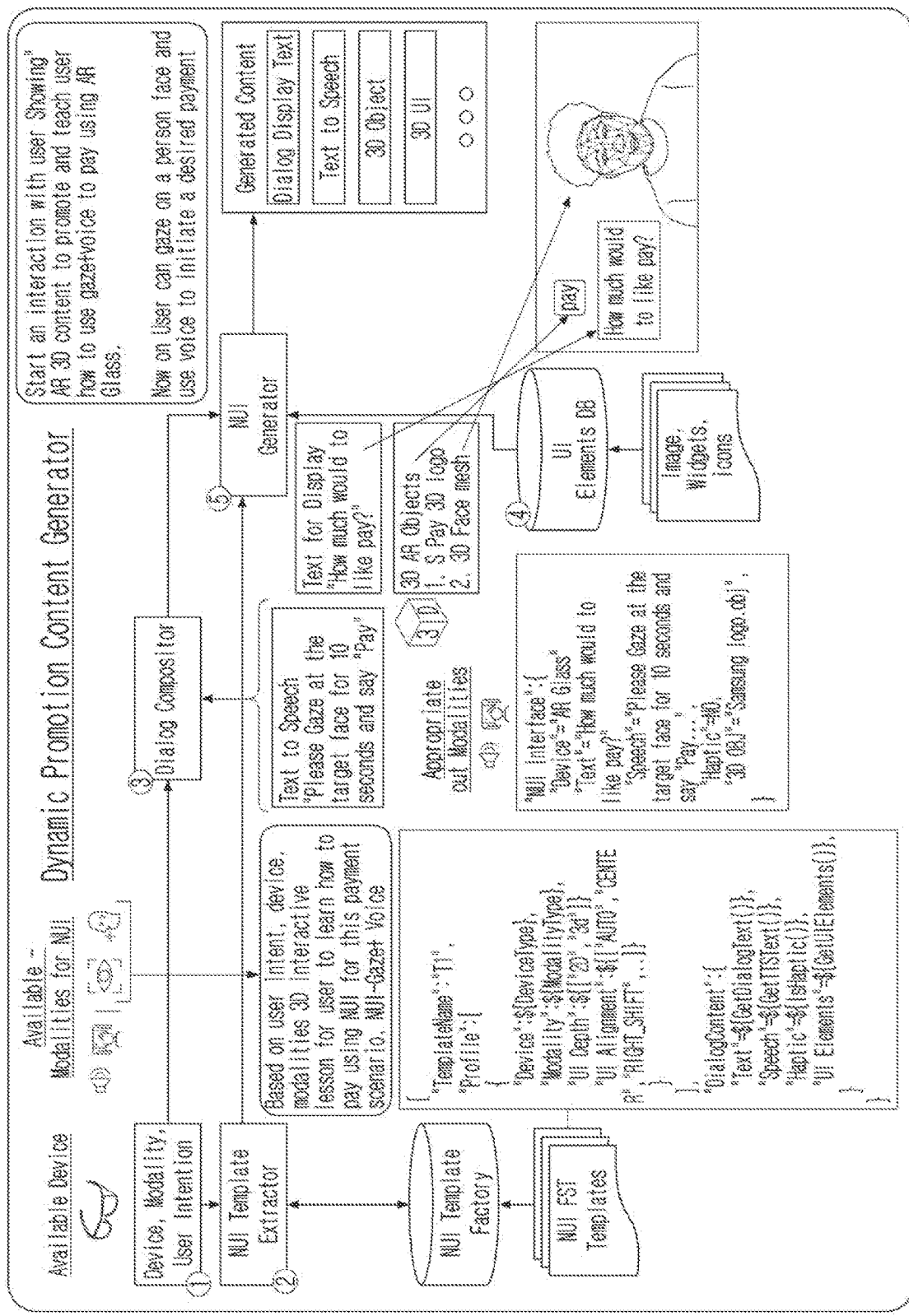
FIG. 13B is an example diagram depicting a use case scenario of crafting the promotion content and indicating the crafted promotion content to the user for interaction, when the user wants to make the money payment, according to various embodiments.

Crafting the promotion content and indicating the crafted promotion content are depicted in FIG. 13B. As depicted in FIG. 13B, for crafting the promotion content, at step 1, the electronic device 204 identifies the AR glass as the first device 202a, the combination of the gaze and voice modalities as the second modality, and the intent and state of the user. At step 2, the electronic device 204 extracts the NUI template from the library of animation GIF assets present in the NUI template database 310 with respect to the second modality and the device characteristics of the AR glass. At step 3, The electronic device 204 crafts the promotion content in the extracted NUI template, based on the second modality, the second device, the intent and state of the user, and the UI elements supported by the AR glass. In an example, the promotion content crafted in the NUI template includes a text to speech content (e.g., "Please gaze at the target face for 10 seconds and say pay"), a text for display/display text content (e.g., "How much would you to like pay?"), and three dimensional (3D) AR objects. The 3D AR objects include a 3D logo depicting a logo of the S pay app, and a 3D face mesh depicting a face of shopkeeper/target face. At step 4, the electronic device 204 generates the NUI (supporting the gesture modality) on the watch of the user and the NUI (supporting the combination of the gaze and voice modalities) on the AR glass, based on the UI elements supported by the AR glass. At step 5, the electronic device 204 indicates the text to speech content like "Please gaze at the target face for 10 seconds and say pay" to the user through the NUI supporting the voice modality generated on the AR glass. Further, the electronic device 204 indicates the display text like "How much would you to like pay?", the 3D logo, and the 3D face mesh in the NUI generated on the AR glass. Thus, the user may gaze on the target face and use the voice modality to initiate the money payment.

Figure 14:
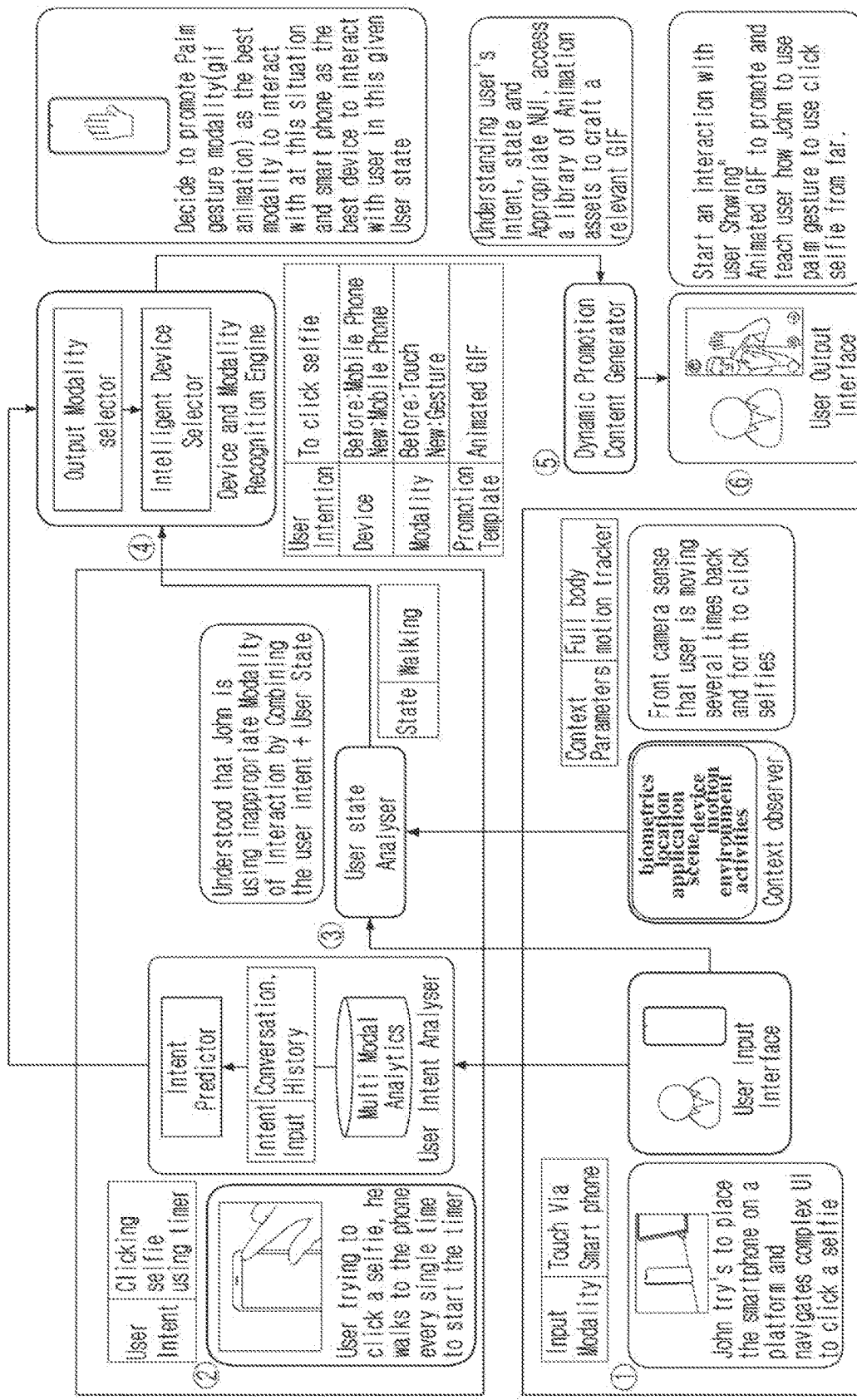
FIG. 14 is an example diagram depicting a use case scenario of suggesting the modality of interaction to the user for clicking a picture/selfie, according to various embodiments.

FIG. 14 is an example diagram depicting a use case scenario of suggesting the modality of interaction to the user for clicking a picture/selfie, according to various embodiments.

Consider an example scenario, wherein at step 1, a user tries to place a smart phone (an example of the first device 202a) on a platform and performs a navigation through a complex UI (e.g., a touch modality/first modality) in the smart phone to click a selfie/picture. In such a scenario, at step 2, the electronic device 204 detects the current intent of the user as "clicking selfie using timer", as the user is trying to click the selfie by walking to the smart phone every single time to start the timer. At step 3, the electronic device 204 collects the user parameters from the user devices 202a-202n associated with the user. Based on the collected user parameters, the electronic device 204 identifies that "the user is moving several times back and forth to click selfies" and accordingly determines the context parameters like "full body motion tracker". The electronic device 204 analyzes the context parameters and detects the state of the user as "walking". Based on the detected intent and state of the user, the electronic device 204 determines that the user is using an inappropriate modality of interaction for clicking the selfie.

Based on the detected intent and state of the user, at step 4, the electronic device 204 selects the smart phone as the second modality and a gesture modality (e.g., a palm gesture) as the second modality to continue the interaction for clicking the selfie.

At step 5, the electronic device 204 crafts the promotion content/animation GIF corresponding to the gesture modality. For crafting the animation GIF, the electronic device 204 extracts the NUI template from the library of animation assets present in the NUI template database 310. The electronic device 204 crafts the animation GIF in the extracted NUI template, based on the second modality, the second device, and the intent and state of the user. The electronic device 204 generates the NUI on the smart phone to indicate the animation GIF to the user, which suggests the user to how to click the selfie using the palm gesture. Thus, the user may click the selfie using the palm gesture.

Figure 15:
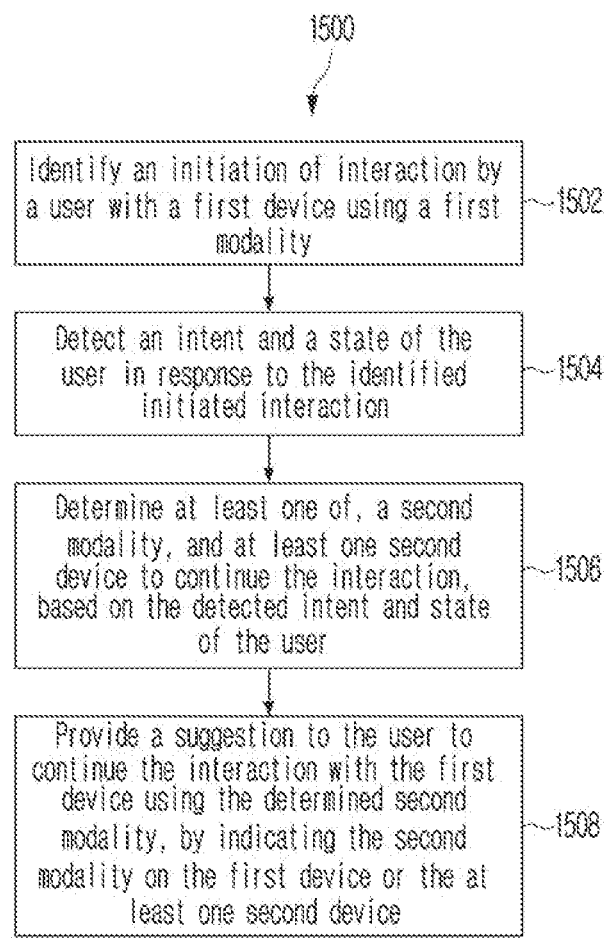
FIG. 15 is a flow diagram depicting a method for suggesting the at least one modality of interaction to the user, according to various embodiments.

FIG. 15 is a flow diagram 1500 depicting a method for suggesting the at least one modality of interaction to the user, according to various embodiments.

At step 1502, the method includes identifying, by the electronic device 204, the initiation of interaction by the user with the first device 202a using the first modality.

At step 1504, the method includes detecting, by the electronic device 204, the intent and the state of the user in response to the identified initiated interaction.

At step 1506, the method includes determining, by the electronic device 204, at least one of the second modality, and the at least one second device (202b-202n), to continue the initiated interaction, based on the detected intent and state of the user.

At step 1508, the method includes providing, by the electronic device 204, the suggestion to the user to continue the interaction with the first device 202a using the determined second modality, by indicating the second modality on the first device 202a or the at least one second device 202b-202n. The various actions in method 1500 may be performed in the order presented, in a different order or simultaneously. Further, in some embodiments, some actions listed in FIG. 15 may be omitted.

Embodiments herein:
  receive multimodal input modalities/perceptions from a user (such as voice, vision, touch, gaze, or the like);
  receive multi-level context depicting various information about an environment, activity of the user, location, a scene, or the like;
  determine an action/intent that the user want to perform by utilizing multi-modal analytics, which keeps track of various multimodal interactions user does with the user devices;

analyze a current state of the user (e.g., if user is running resting, driving or in some emergency like situation, or the like) based on the multi-level context;

determine one or more most suitable output/alternative modalities that the user may use to interact and one or more most suitable output devices that handle the output modality, based on the intent and the current state of the user;

generate/craft appropriate content/NUI information dynamically from available most suitable templates based on the one or more output devices, and the one or more output modalities; and assemble the NUI information in a form of multimodal response and deliver the multimodal response to the user based on the best possible available output device and modality.

The embodiments disclosed herein can be implemented through at least one software program running on at least one hardware device and performing network management functions to control the elements. The elements shown in FIGS. 2-8 can be at least one of a hardware device, or a combination of hardware device and software module. For example, the above-described embodiments may be implemented as programs executable on a computer, and be implemented by a general-purpose digital computer for operating the programs by using a non-transitory computer-readable medium. Data structures used in the above-described embodiments may be recorded on the computer-readable medium via a variety of means. The above-described embodiments of the disclosure may be implemented in the form of a non-transitory computer-readable recording medium including instructions executable by the computer, such as a program module executed by the computer. For example, methods implemented by software modules or algorithms may be stored in a computer-readable medium as computer-readable codes or program commands executable by the computer.

The non-transitory computer-readable recording medium may be any recording medium that are accessible by the computer, and examples thereof may include both volatile and non-volatile media and both detachable and non-detachable media. Examples of the computer-readable medium may include magnetic storage media (e.g., ROM, floppy disks, and hard disks) and optical recording media (e.g., compact disc-ROM (CD-ROM) and digital versatile discs (DVDs)), but are not limited thereto. Furthermore, the computer-readable recording medium may include a computer storage medium and a communication medium. A plurality of computer-readable recording media may be distributed over network-coupled computer systems, and data, e.g., program instructions and codes, stored in the distributed recording media may be executed by at least one computer.

The embodiments disclosed herein describe methods and systems for providing an enhanced response to a query in an IoT environment. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an example embodiment through or together with a software program written in e.g., Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the embodiments may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for suggesting at least one modality of interaction, the method comprising:

identifying, by an electronic device, initiation of an interaction by a user with a first device using a first modality;

detecting, by the electronic device, an intent of the user and a state of the user based on the identified initiated interaction;

determining, by the electronic device, at least two of second modalities and at least one second device, to continue the initiated interaction, based on the detected intent of the user and the detected state of the user; and providing, by the electronic device, a suggestion to the user to continue the interaction with the first device using combination of the at least two of second modalities, by indicating the at least two of second modalities on the first device or the at least one second device.

2. The method of claim 1, wherein the detecting, by the electronic device, the intent of the user comprises:

analyzing at least one of the first modality, the interaction of the user with the first device, an interaction history, and data collected from a plurality of user devices associated with the user to detect the intent of the user.

3. The method of claim 2, wherein the data collected from the plurality of user devices comprises at least one of user parameters, and a status and location of each user device.

4. The method of claim 1, wherein the detecting, by the electronic device, the state of the user comprises:

determining a context of the user based on user parameters collected from a plurality of user devices associated with the user; and analyzing the first modality and the context of the user to detect the state of the user.

5. The method of claim 1, wherein the determining, by the electronic device, the at least two of second modalities and the at least one second device comprises:

creating an intent-state pair, based on the detected intent of the user and the detected state of the user corresponding to the initiated interaction with the first device;

querying an intent-state-modality mapping database for the created intent-state pair, wherein the intent-state-modality mapping database includes a mapping of the at least two of second modalities and the at least one second device with each of a plurality of intent and state pairs; and receiving information about the at least two of second modalities and the at least one second device for the created intent-state pair from the intent-state-modality mapping database.

6. The method of claim 1, wherein the providing, by the electronic device, the suggestion comprises:

generating a promotion content corresponding to the at least two of second modalities; and providing the suggestion to the user to continue the interaction with the first device using the at least two of second modalities, by indicating the promotion content corresponding to the at least two of second modalities on the first device or the at least one second device.

7. The method of claim 6, wherein the generating the promotion content corresponding to the at least two of second modalities comprises:

extracting at least one natural user interface (NUI) template from a NUI template database corresponding to the at least two of second modalities and device characteristics of the first device or the at least one second device; and generating the promotion content corresponding to the at least two of second modalities in the extracted NUI template, based on at least one of the intent and the state of the user, and the at least two of second modalities.

8. The method of claim 7, wherein the NUI template database includes a mapping of a plurality of NUI templates with each of a plurality of modalities and each of the device characteristics of the first device or the at least one second device.

9. The method of claim 6, wherein the indicating the promotion content corresponding to the at least two of second modalities on the first device or the at least one second device comprises:

generating a NUI interface on the first device, or the at least one second device based on at least one user interface (UI) element supported by the first device or the at least one second device; and indicating the promotion content corresponding to the at least two of second modalities in the at least one NUI template on the NUI interface generated on the first device or the at least one second device.

10. The method of claim 1, wherein the providing, by the electronic device, the suggestion comprises:

generating, by the electronic device, a user interface on the first device or the at least one second device for continuing the interaction using the at least two of second modalities on the first device.

11. The method of claim 10, wherein the determining the at least one of the at least two of second modalities and the at least one second device comprises:

evaluating the state of the user using a multi-device input to determine the at least one of the at least two of second modalities and the at least one second device.

12. The method of claim 10, wherein the generating the user interface on the first device or the at least one second device comprises:

crafting a Natural User Interface (NUI) information by evaluating at least one of the intent and the state of the user, and the at least two of second modalities; and assembling the crafted NUI information in the user interface generated on the first device or the second device.

13. The method of claim 12, wherein the NUI information indicates to the user about the at least two of second modalities in a required media type to continue the interaction with the first device.

14. An electronic device comprising:

a memory storing instructions; and a processor configured to execute the instructions to:

identify an initiation of interaction by a user with a first device using a first modality;

detect an intent of the user and a state of the user based on the identified initiated interaction;

determine at least two of second modalities and at least one second device to continue the interaction, based on the detected intent and state of the user; and provide a suggestion to the user to continue the interaction with the first device using combination of the at least two of second modalities, by indicating the at least two of second modalities on the first device or the at least one second device.

15. The electronic device of claim 14, wherein the processor is further configured to execute the instructions to:

analyze at least one of the first modality, the interaction of the user with the first device, an interaction history, and data collected from a plurality of user devices associated with the user to detect the intent of the user.

16. The electronic device of claim 14, wherein the processor is further configured to execute the instructions to detect the state of the user by:

determining a context of the user based on the user parameters collected from a plurality of user devices associated with the user; and analyzing the first modality and the context of the user to detect the state of the user.

17. The electronic device of claim 14, wherein the processor is further configured to execute the instructions to:

create an intent-state pair, based on the detected intent and the state of the user corresponding to the initiated interaction with the first device;

query an intent-state-modality mapping database for the created intent-state pair, wherein the intent-state-modality mapping database includes a mapping of the second modality at least two of second modalities and the at least one second device with each of a plurality of intent and state pairs; and receive information about the at least two of second modalities and the at least one second device for the created intent-state pair from the intent-state-modality mapping database.

18. The electronic device of claim 14, wherein the processor is further configured to execute the instructions to:

generate a promotion content corresponding to the at least two of second modalities; and provide the suggestion to the user to continue the interaction with the first device using the at least two of second modalities, by indicating the promotion content corresponding to the at least two of second modalities on the first device or the at least one second device.

19. The electronic device of claim 18, wherein the processor is further configured to execute the instructions to:

extract at least one natural user interface (NUI) template from a NUI template database corresponding to the at least two of second modalities and device characteristics of the first device or the at least one second device; and generate the promotion content corresponding to the at least two of second modalities in the extracted NUI template, based on at least one of the intent and the state of the user, and the at least two of second modalities.

20. A non-transitory computer readable medium for storing computer readable program code or instructions which are executable by a processor to perform a method for suggesting at least one modality of interaction, the method comprising:

identifying, by an electronic device, initiation of an interaction by a user with a first device using a first modality;

detecting, by the electronic device, an intent of the user and a state of the user based on the identified initiated interaction;

determining, by the electronic device, at least two of second modalities and at least one second device, to continue the initiated interaction, based on the detected intent and state of the user; and providing, by the electronic device, a suggestion to the user to continue the interaction with the first device using combination of the at least two of second modalities, by indicating the at least two of second modalities on the first device or the at least one second device.

* * * * *